United States Patent
Misra et al.

(10) Patent No.: US 10,013,637 B2
(45) Date of Patent: Jul. 3, 2018

(54) OPTIMIZING MULTI-CLASS IMAGE CLASSIFICATION USING PATCH FEATURES

(71) Applicant: Microsoft Technology Licensing, LLC., Redmond, WA (US)

(72) Inventors: Ishan Misra, Pittsburg, PA (US); Jin Li, Bellevue, WA (US); Xian-Sheng Hua, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 157 days.

(21) Appl. No.: 14/602,494

(22) Filed: Jan. 22, 2015

(65) Prior Publication Data

US 2016/0217344 A1    Jul. 28, 2016

(51) Int. Cl.
*G06K 9/62* (2006.01)

(52) U.S. Cl.
CPC .......... *G06K 9/6227* (2013.01); *G06K 9/623* (2013.01); *G06K 9/6218* (2013.01); *G06K 9/6262* (2013.01)

(58) Field of Classification Search
CPC .... G06K 9/6218; G06K 9/6227; G06K 9/623; G06K 9/6262
See application file for complete search history.

(56) References Cited

U.S. PATENT DOCUMENTS

| | | | |
|---|---|---|---|
| 6,327,581 B1 | 12/2001 | Platt | |
| 6,762,769 B2 | 7/2004 | Guo et al. | |
| 6,915,025 B2 | 7/2005 | Wang et al. | |
| 7,124,149 B2 | 10/2006 | Smith et al. | |
| 7,164,798 B2 | 1/2007 | Hua et al. | |
| 7,386,527 B2 | 6/2008 | Harris et al. | |
| 7,558,764 B2 | 7/2009 | Abe et al. | |

(Continued)

FOREIGN PATENT DOCUMENTS

| CN | 103246893 | 8/2013 |
|---|---|---|
| WO | WO2014009490 A1 | 1/2014 |

OTHER PUBLICATIONS

Chen, Xinlei, Abhinav Shrivastava, and Abhinav Gupta. "Enriching visual knowledge bases via object discovery and segmentation." Proceedings of the IEEE conference on computer vision and pattern recognition. 2014.*

(Continued)

*Primary Examiner* — Nirav G Patel

(57) ABSTRACT

Optimizing multi-class image classification by leveraging patch-based features extracted from weakly supervised images to train classifiers is described. A corpus of images associated with a set of labels may be received. One or more patches may be extracted from individual images in the corpus. Patch-based features may be extracted from the one or more patches and patch representations may be extracted from individual patches of the one or more patches. The patches may be arranged into clusters based at least in part on the patch-based features. At least some of the individual patches may be removed from individual clusters based at least in part on determined similarity values that are representative of similarity between the individual patches. The system may train classifiers based in part on patch-based features extracted from patches in the refined clusters. The classifiers may be used to accurately and efficiently classify new images.

20 Claims, 11 Drawing Sheets

(56) References Cited

U.S. PATENT DOCUMENTS

| | | | |
|---|---|---|---|
| 7,873,583 B2 | 1/2011 | Laxman et al. | |
| 7,983,486 B2 | 7/2011 | Zhou | |
| 8,086,549 B2 | 12/2011 | Qi et al. | |
| 8,140,450 B2 | 3/2012 | Porikli et al. | |
| 8,386,574 B2 | 2/2013 | Chidlovskii et al. | |
| 8,509,478 B2 | 8/2013 | Haas et al. | |
| 8,605,956 B2 | 12/2013 | Ross et al. | |
| 8,645,380 B2 | 2/2014 | Wang et al. | |
| 8,781,978 B2 | 7/2014 | Milenova et al. | |
| 8,805,067 B2 | 8/2014 | Lee et al. | |
| 9,785,866 B2 | 10/2017 | Hua et al. | |
| 2009/0290802 A1 | 11/2009 | Hua et al. | |
| 2012/0254191 A1 | 10/2012 | Sanyal et al. | |
| 2012/0263388 A1 | 10/2012 | Vaddadi et al. | |
| 2014/0140610 A1 | 5/2014 | Tu et al. | |
| 2014/0241623 A1 | 8/2014 | Wang et al. | |
| 2014/0270350 A1 | 9/2014 | Rodriguez-Serrano et al. | |
| 2014/0270495 A1 | 9/2014 | Tu et al. | |
| 2015/0317389 A1 | 11/2015 | Hua et al. | |
| 2015/0380009 A1 | 12/2015 | Chang et al. | |
| 2016/0140451 A1 | 5/2016 | Li et al. | |

OTHER PUBLICATIONS

Chen, et al., "Action recognition through discovering distinctive action parts", Journal of the Optical Society of America A, vol. 32, No. 2, Jan. 8, 2015, pp. 173-185, 13 pages.

Chen, et al, "Learning a Compact Latent Representation of the Bag-of-Parts Model", 2014 IEEE International Conference on Image Processing (ICIP 2014): Paris, France, Oct. 27-30, Oct. 1, 2014, pp. 5926-5930, 5 pages.

Hariharan, et al., "Discriminative Decorrelation for Clustering and Classification", Computer Vision ECCV, Oct. 7, 2012, pp. 459-472, 14 pages.

PCT ISR and Written Opinion for PCT/US2015/067554, dated Mar. 24, 2016.

Sicre, et al., "Discovering and Aligning Discriminative Mid-level Features for Image Classification", International Conference on Pattern Recognition, IEEE Computer Society, US, Aug. 24, 2014, pp. 1975-1980, 6 pages.

Bins, et al., "Feature Selection from Huge Feature Sets", In Proceedings of Eighth IEEE International Conference on Computer Vision, vol. 2, Jul. 7, 2001, 7 pages.

Cohen, et al., "Redundancy-Aware Topic Modeling for Patient Record Notes", PLOS One, vol. 9, No. 2, Feb. 13, 2014, 7 Pages.

"International Search Report & Written Opinion Received for PCT Application No. PCT/US2015/027408", dated Sep. 8, 2015, 11 Pages.

Li, et al., "Pachinko Allocation DAGStructured Mixture Models of Topic Correlations", In Proceedings of the 23rd international conference on Machine learning, Jun. 25, 2006, 8 pages.

Qiu, et al., "Objects Over the World", In Advances in Multimedia Information Processing—PCM 2008, Lecture Notes in Computer Science, Series vol. 5353, Dec. 9, 2008, 10 pages.

Sristy, et al., "Paired Feature Constraints for Latent Dirichlet Topic Models", In Proceedings of International Conference of Soft Computing and Pattern Recognition, Dec. 15, 2013, 6 pages.

Ciaramita, et al., "Supersense Tagging of Unknown Nouns in WordNet", In Proceedings of the 2003 Conference on Empirical Methods in Natural Language Processing, Jul. 11, 2003, pp. 168-175. 8 pages.

Crammer, et al., "Ultraconservative Online Algorithms for Multiclass Problems", In Proceedings of 14th Annual Conference on Computational Learning Theory, Jul. 16, 2001, pp. 99-115. 17 pages.

"International Search Report and Written Opinion Issued in PCT Application No. PCT/US2016/013497", dated Apr. 21, 2016, 14 pages.

Jumutc, et al., "Multi-Class Supervised Novelty Detection", In Proceedings of IEEE Transactions on Pattern Analysis and Machine Intelligence, vol. 36, Issue 12, Jun. 3, 2014, pp. 2510-2523. 14 pages.

The PCT International Preliminary Report on Patentability dated Jul. 26, 2016 for PCT application No. PCT/US2015/027408, 20 pages.

Hautamaki et al, "Improving K-Means by Outlier Removal", SCIA, Jun. 2005, pp. 978-pp. 987, 10 pages.

Larsen et al, "Fast and Effective Text Mining Using Linear-time Document Clustering" KDD-99, 2009, pp. 16-pp. 23, 7 pages.

Office Action for U.S. Appl. No. 14/266,228, dated Sep. 21, 2016, Hua et al., "Learning Multimedia Semantics from Large-Scale Unstructured Data", 14 pages.

Wen et al., "Clustering User Queries of a Search Engine", WWW10, May 1-5, 2001, Hong Kong, pp. 162-pp. 168, 7 pages.

Xu et al., "Towards the Semantic Web: Collaborative Tag Suggestions", Collaborative web tagging workshop at WWW2006, pp. 1-pp. 8, 8 pages.

Abe, et al., "An Iterative Method for Multi-class Cost-sensitive Learning", In Proceedings of the Tenth ACM SIGKDD International Conference on Knowledge Discovery and Data Mining, Aug. 22, 2004, 9 pages.

Aghajanian, et al., "Patch-based Within-Object Classi?cation", In Proceedings of IEEE 12th International Conference on Computer Vision, Sep. 27, 2009, 8 pages.

Antic, et al., "Learning Latent Constituents for Recognition of Group Activities in Video", In Proceedings of the European Conference on computer Vision, Sep. 6, 2014, 15 pages.

Brown, et al., "Multi-Image Matching using Multi-Scale Oriented Patches", "In Proceedings of the IEEE Computer Society Conference on Computer Vision and Pattern Recognition", Jun. 20, 2005, 8 pages.

Chen, et al., "NEIL: Extracting Visual Knowledge from Web Data", In IEEE International Conference on Computer Vision, Dec. 1, 2013, 8 pages.

Divvala, et al., "Learning Everything About Anything: Webly Supervised Visual Concept Learning", In IEEE Conference on Computer Vision and Pattern Recognition, Jun. 23, 2014, 8 pages.

Jain, et al., "Active Learning for Large Multi-class Problems", In IEEE Conference on Computer Vision and Pattern Recognition, Jun. 20, 2009, 8 pages.

Jain, et al., "Fast Image Search for Learned Metrics", In Proceedings of IEEE Conference on Computer Vision and Pattern Recognition, Jun. 28, 2008, 8 pages.

Jain, et al., "Multi-Class Open Set Recognition Using Probability of Inclusion", In European Conference on Computer Vision, Sep. 6, 2014, 17 pages.

Juneja, et al., "Blocks that Shout: Distinctive Parts for Scene Classification", In IEEE Conference on Computer Vision and Pattern Recognition, Jun. 23, 2013, 8 pages.

Lei, et al., "Half-Against-Half Multi-class Support Vector Machines", In Proceedings of the 6th international conference on Multiple Classifier Systems, Jun. 13, 2005, 2 pages.

Li, et al., "Harvesting Mid-level Visual Concepts from Large-scale Internet Images", In Proceedings of IEEE Conference on Computer Vision and Pattern Recognition, Jun. 25, 2013, 8 pages.

Liu, et al., "Gathering Training Sample Automatically for Social Event Visual Modeling", In Proceedings of International Workshop on Socially-Aware Multimedia, Oct. 29, 2012, pp. 9-14.

Manzato, et al., "Automatic Annotation of Tagged Content Using Predefined Semantic Concepts", In Proceedings of 18th Brazilian symposium on Multimedia and the Web, Oct. 15, 2012, pp. 237-244.

Misra, et al., "Data-driven Exemplar Model Selection", In Proceedings of IEEE Winter Conference on Applications of Computer Vision, Mar. 24, 2014, 8 pages.

Setz, et al., "Can Social Tagged Images Aid Concept-Based Video Search?", In IEEE International Conference on Multimedia and Expo, Jun. 28, 2009, pp. 1460-1463.

Singh, et al., "Unsupervised Discovery of Mid-level Discriminative Patches", In Proceedings of the 12th European Conference on Computer Vision, Oct. 7, 2014, 14 pages.

(56) References Cited

OTHER PUBLICATIONS

Ulges, et al., "Learning Visual Contexts for Image Annotation from Flickr Groups", In IEEE Transactions on Multimedia, vol. 13, Issue 2, Apr. 2011, pp. 330-341.
Zhu, et al., "On the Sampling of Web Images for Learning Visual Concept Classifiers" In Proceedings of the ACM International Conference on Image and Video Retrieval, Jul. 5, 2010, pp. 50-57.
U.S. Appl. No. 14/266,228, Ushiku, et al., "Learning Multimedia Semantics from Large-Scale Unstructured Data", filed Apr. 30, 2014.
Yao, et al., "Strokelets A Learned Multi-Scale Representation for Scene Text Recognition", In Proceedings of IEEE Conference on Computer Vision and Pattern Recognition, Jun. 23, 2014, 8 pages.
Zhang, et al., "Active Learning through Notes Data in Flickr", In Proceedings of 1st ACM International Conference on Multimedia Retrieval, Apr. 17, 2011, 8 pages.
International Preliminary Report on Patentability for PCT/US2015/067554, dated Apr. 10, 2017, 21 pages.
F. Moosmann et al., "Randomized Clustering Forests for Image Classification", IEEE Trans. on Pattern Anal. and Mach. Intel., vol. 30, No. 9, Sep. 2008, pp. 1632-1646, 15 pages.
Office Action for U.S. Appl. No. 14/266,228, dated May 18, 2017, Hua et al., "Learning Multimedia Semantics from Large-Scale Unstructured Data", 14 pages.
Rokach et al., "Clustering Methods", in Data Mining and Knowledge Discovery Handbook, Springer US, 2005, pp. 321-352, 32 pages.
Office Action for U.S. Appl. No. 14/266,228, dated Jan. 12, 2017, Hua et al., "Learning Multimedia Semantics from Large-Scale Unstructured Data", 15 pages.
Office Action for U.S. Appl. No. 14/602,524, dated Dec. 16, 2016, Hua et al., "Optimizing Multi-Class Multimedia Data Classification Using Negative Data", 6 pages.
Second Written Opinion Issued in PCT Application No. PCT/US2015/067554, dated Dec. 22, 2016, 7 Pages.
Cheng, et al., "BING: Binarized Normed Gradients for Objectness Estimation at 300fps", In Proceedings of Computer Vision and Pattern Recognition, Jun. 24, 2014, 8 pages.
PCT International Preliminary Report on Patentability in Application No. PCT/US2016/013497, dated Jul. 25, 2017, 10 pages.
PCT Second Written Opinion in Application No. PCT/US2015/027408, dated Mar. 11, 2016, 7 Pages.
U.S. Appl. No. 14/266,228, Amendment and Response filed Nov. 14, 2016, 25 pages.
U.S. Appl. No. 14/266,228, Amendment and Response filed Apr. 11, 2017, 18 pages.
U.S. Appl. No. 14/266,228, Amendment and Response filed Aug. 18, 2017, 10 pages.
U.S. Appl. No. 14/266,228, Office Action dated Sep. 21, 2016, Hua et al., "Learning Multimedia Semantics from Large-Scale Unstructured Data", 15 pages.
U.S. Appl. No. 14/602,524, Amendment and Response filed Mar. 16, 2017, 29 pages.
U.S. Appl. No. 14/602,524, Notice of Allowance dated Jun. 5, 2017, 7 pages.
U.S. Appl. No. 14/602,524, Notice of Allowance dated Aug. 23, 2017, 7 pages.

\* cited by examiner

OPTIMIZING MULTI-CLASS IMAGE CLASSIFICATION USING PATCH FEATURES

BACKGROUND

Computer vision may include object recognition, object categorization, object class detection, image classification, etc. Object recognition may describe finding a particular object (e.g., a handbag of a particular make, a face of a particular person, etc.). Object categorization and object class detection may describe finding objects that belong in a particular category or class (e.g., faces, shoes, cars, etc.). Image classification may describe assigning an entire image to a particular category or class (e.g., location recognition, texture classification, etc.). Computerized object recognition, detection, and/or classification using images is challenging because objects in the real world vary greatly in visual appearance. For instance, objects associated with a single label (e.g., cat, dog, car, house, etc.) exhibit diversity in color, shape, size, viewpoint, lighting, etc.

Some current object detection, recognition, and/or classification methods include training classifiers based on supervised, or labeled, data. Such methods are not scalable. Others of the current object detection, recognition, and/or classification methods leverage localized image features (e.g., Histogram of Oriented Gradients (HOG)) to learn common-sense knowledge (e.g., eye is part of a person) or specific sub-labels of generic labels (e.g., a generic label of horse includes sub-labels of brown horse, riding horse, etc.). However, using localized image features (e.g., HOG) is computationally intensive. Accordingly, current techniques for object detection, recognition, and/or classification are not scalable and are computationally intensive.

SUMMARY

This disclosure describes techniques for optimizing multi-class image classification by leveraging patch-based features extracted from weakly supervised images. The techniques described herein leverage patch-based features to optimize the multi-class image classification by improving accuracy in using classifiers to classify incoming images and reducing the amount of computational resources used for training classifiers.

The systems and methods describe learning classifiers from weakly supervised images available on the Internet. In at least some examples, the systems described herein may receive a corpus of images associated with a set of labels. Each image in the corpus of images may be associated with at least one label in the set of labels. The system may extract one or more patches from individual images in the corpus of images. The system may extract patch-based features from the one or more patches and patch representations from individual patches of the one or more patches. The system may arrange the patches into clusters based at least in part on the patch-based features. Moreover, the system may determine similarity values representative of a similarity between individual patches. At least some of the individual patches may be removed from individual clusters based at least in part on the similarity values. The system may extract patch-based features based at least in part on patches remaining in refined clusters. The system may train classifiers based at least in part on the patch-based features.

The systems and methods further describe applying the classifiers to classify new images. In at least one example, a user may input an image into the trained system described herein. The system may extract patches from the image and extract features from the image. The system may apply a classifier to the extracted features to classify the new image. Additionally, the system may output a result to the user. The result may include classification of the image determined by applying the classifier to the features extracted from the image.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
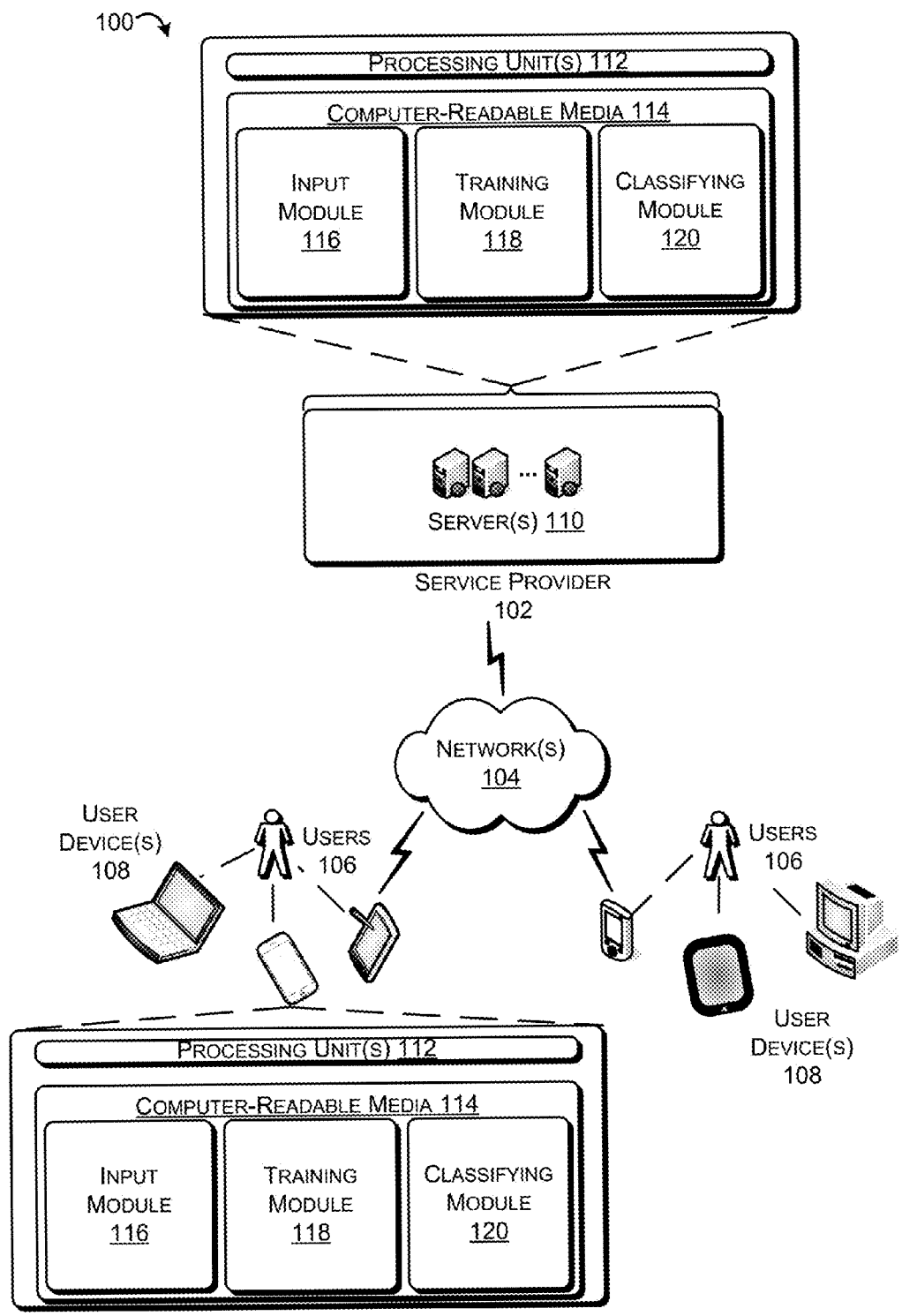
FIG. 1 is a diagram showing an example system for training classifiers from images and applying the trained classifiers to classify new images.

Computer vision object (e.g., people, animals, landmarks, etc.), texture, and/or scene classification in images (e.g., photo, video, etc.) may be useful for several applications including photo and/or video recognition, image searching, product related searching, etc. Current classification methods include training classifiers based on supervised, or labeled, data. Such methods are not scalable or extendable. Moreover, current classification methods leverage localized image features (e.g., HOG) to learn common-sense knowledge (e.g., eye is part of a person) or specific sub-labels of generic labels (e.g., a generic label of horse includes sub-labels of brown horse, riding horse, etc.). However, using localized image features (e.g., HOG) is computationally intensive. That is, current data-mining techniques require substantial investments of computer resources and are not scalable and/or extendable.

Techniques described herein optimize multi-class image classification by leveraging patch-based features extracted from weakly supervised images. The systems and methods described herein may be useful for training classifiers and classifying images using the classifiers. Such classification may be leveraged for several applications including object recognition (e.g., finding a particular object such as a handbag of a particular make, a face of a particular person, etc.), object categorization or class detection (e.g., finding objects that belong in a particular category or class), and/or image classification (e.g., assigning an entire image to a particular category or class). For instance, such classification may be useful for photo and/or video recognition, image searching, product related searching, etc. The techniques described herein leverage patch-based features to optimize the multi-class image classification by reducing the amount of computational resources used for training classifiers. Additionally, using patch-based features improves efficiency and accuracy in using the classifiers to classify incoming images.

The systems and methods describe learning classifiers from weakly supervised images available on the Internet. In at least some examples, the system described herein may receive a corpus of images associated with a set of labels. Each image in the corpus of images may be associated with at least one label in the set of labels. The system may extract one or more patches from individual images in the corpus of images. A patch may represent regions or parts of an image. Patches may be representative of an object or a portion of an object in an image and may be discriminative such that they may be detected in multiple images with high recall and precision. In at least some examples, patches may be discriminative such that they may be detected in a number of images associated with a same label more frequently than they may be detected in images associated with various, different labels.

The system may extract patch-based features from the individual images. Patch-based features are image-level features that describe or represent an image. Patch-based features may represent a patch distribution over a patch dictionary as described below. Patch-based features for an individual image are based at least in part patches that are extracted from the individual image. In some examples, a plurality of patches is extracted from an individual image and the patch-based features may be based on the plurality of patches extracted from the individual image. In other examples, only a single patch is extracted from an image and the patch-based features may be based on the single patch. Patch-based features enable the systems described herein to train classifiers using less data, therefore increasing efficiency and reducing computational resources consumed for training.

The system may extract patch representations from the individual patches. Patch representations describe features extracted from individual patches. Patch representations may represent patch-level features and may be used for refining the clusters, as described below.

The system may arrange individual patches of the one or more patches into clusters based at least in part on patch-based features. Individuals of the clusters correspond to individual labels of the set of labels. The clusters may be refined based at least in part on the patch-based features. The system may determine similarity values based at least in part on the patch representations. The similarity values may be representative of similarity between individual patches in same and/or different clusters. The system may process the clusters to remove at least some of the individual patches based at least in part on the similarity values. Based at least in part on the patches that remain after processing the clusters, the system may extract patch-based features from the patches in the refined clusters. The system may leverage the patch-based features extracted from the refined clusters of patches to train classifiers.

The systems and methods herein further describe applying the classifiers to classify new images. In at least one example, a user may input an image into the trained system described herein. The system may extract patches and features from the image. The system may apply a classifier to the extracted features to classify the input image. Additionally, the system may output a result to the user. The result may include classification of the image determined by applying the classifier to the features extracted from the image.

Illustrative Environment

The environment described below constitutes but one example and is not intended to limit application of the system described below to any one particular operating environment. Other environments may be used without departing from the spirit and scope of the claimed subject matter. The various types of processing described herein may be implemented in any number of environments including, but not limited to, stand alone computing systems, network environments (e.g., local area networks or wide area networks), peer-to-peer network environments, distributed-computing (e.g., cloud-computing) environments, etc.

FIG. 1 is a diagram showing an example system 100 for training classifiers from images and applying the trained classifiers to classify new images. More particularly, the example operating environment 100 may include a service provider 102, one or more network(s) 104, one or more users 106, and one or more user devices 108 associated with the one or more users 106. Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric.

As shown, the service provider 102 may include one or more server(s) 110, which may include one or more processing unit(s) 112 and computer-readable media 114. Executable instructions stored on computer-readable media 114 can include, for example, an input module 116, a training module 118, and a classifying module 120, and other modules, programs, or applications that are loadable and executable by processing units(s) 112 for classifying images. The one or more server(s) 110 may include devices. The service provider 102 may be any entity, server(s), platform, etc., that may learn classifiers from weakly supervised images and apply the learned classifiers for classifying new images. The service provider 102 may receive a corpus of images associated with a set of labels and may extract patches from individual images in the corpus. The service provider 102 may extract features from the patches and images for training a classifier. The service provider 102 may leverage the classifier to classify new images input by users 106.

In some examples, the network(s) 104 may be any type of network known in the art, such as the Internet. Moreover, the users 106 may communicatively couple to the network(s) 104 in any manner, such as by a global or local wired or wireless connection (e.g., local area network (LAN), intranet, etc.). The network(s) 104 may facilitate communication between the server(s) 110 and the user devices 108 associated with the users 106.

In some examples, the users 106 may operate corresponding user devices 108 to perform various functions associated with the user devices 108, which may include one or more processing unit(s) 112, computer-readable storage media 114, and a display. Executable instructions stored on computer-readable media 114 can include, for example, the input module 116, the training module 118, and the classifying module 120, and other modules, programs, or applications that are loadable and executable by processing units(s) 112 for classifying images. Furthermore, the users 106 may utilize the user devices 108 to communicate with other users 106 via the one or more network(s) 104.

User device(s) 108 can represent a diverse variety of device types and are not limited to any particular type of device. Examples of device(s) 108 can include but are not limited to stationary computers, mobile computers, embedded computers, or combinations thereof. Example stationary computers can include desktop computers, work stations, personal computers, thin clients, terminals, game consoles, personal video recorders (PVRs), set-top boxes, or the like. Example mobile computers can include laptop computers, tablet computers, wearable computers, implanted computing devices, telecommunication devices, automotive computers, personal data assistants (PDAs), portable gaming devices, media players, cameras, or the like. Example embedded computers can include network enabled televisions, integrated components for inclusion in a computing device, appliances, microcontrollers, digital signal processors, or any other sort of processing device, or the like.

As described above, the service provider 102 may include one or more server(s) 110, which may include devices. Examples support scenarios where device(s) that may be included in the one or more server(s) 110 can include one or more computing devices that operate in a cluster or other clustered configuration to share resources, balance load, increase performance, provide fail-over support or redundancy, or for other purposes. Device(s) included in the one or more server(s) 110 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

As described above, device(s) that may be included in the one or more server(s) 110 and/or user device(s) 108 can include any type of computing device having one or more processing unit(s) 112 operably connected to computer-readable media 114 such as via a bus, which in some instances can include one or more of a system bus, a data bus, an address bus, a PCI bus, a Mini-PCI bus, and any variety of local, peripheral, and/or independent buses. Executable instructions stored on computer-readable media 114 can include, for example, the input module 116, the training module 118, and the classifying module 120, and other modules, programs, or applications that are loadable and executable by processing units(s) 112. Alternatively, or in addition, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZyXEL® or Altera® that includes a CPU course embedded in an FPGA fabric.

Device(s) that may be included in the one or more server(s) 110 and/or user device(s) 108 can further include one or more input/output (I/O) interface(s) coupled to the bus to allow device(s) to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like). Devices that may be included in the one or more server(s) 110 can also include one or more network interfaces coupled to the bus to enable communications between computing device and other networked devices such as user device(s) 108. Such network interface(s) can include one or more network interface controllers (NICs) or other types of transceiver devices to send and receive communications over a network. For simplicity, some components are omitted from the illustrated system.

Processing unit(s) 112 can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In various examples, the processing unit(s) 112 may execute one or more modules and/or processes to cause the server(s) 110 to perform a variety of functions, as set forth above and explained in further detail in the following disclosure. Additionally, each of the processing unit(s) 112 may possess its own local memory, which also may store program modules, program data, and/or one or more operating systems.

In at least one configuration, the computer-readable media 114 of the server(s) 110 and/or user device(s) 108 may include components that facilitate interaction between the service provider 102 and the users 106. For example, the computer-readable media 114 may include the input module 116, the training module 118, and the classifying module 120, as described above. The modules (116, 118, and 120) can be implemented as computer-readable instructions, various data structures, and so forth via at least one processing unit(s) 112 to configure a device to execute instructions and to perform operations implementing training classifiers from images and leveraging the classifiers to classify new images. Functionality to perform these operations may be included in multiple devices or a single device.

Depending on the exact configuration and type of the server(s) 110 and/or the user devices 108, the computer-readable media 114 may include computer storage media and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media may embody computer readable instructions, data structures, program modules, or other data in a modulated data signal, such as a carrier wave, or other transmission mechanism. The term "modulated data signal" means a signal that has one or more of its characteristics set or changed in such a manner as to encode information in the signal. Such signals or carrier waves, etc. can be propagated on wired media such as a wired network or direct-wired connection, and/or wireless media such as acoustic, RF, infrared and other wireless media. As defined herein, computer storage media does not include communication media. That is, computer storage media does not include communication media consisting solely of a modulated data signal, a carrier wave, or a propagated signal, per se.

Training Classifiers

Figure 2:
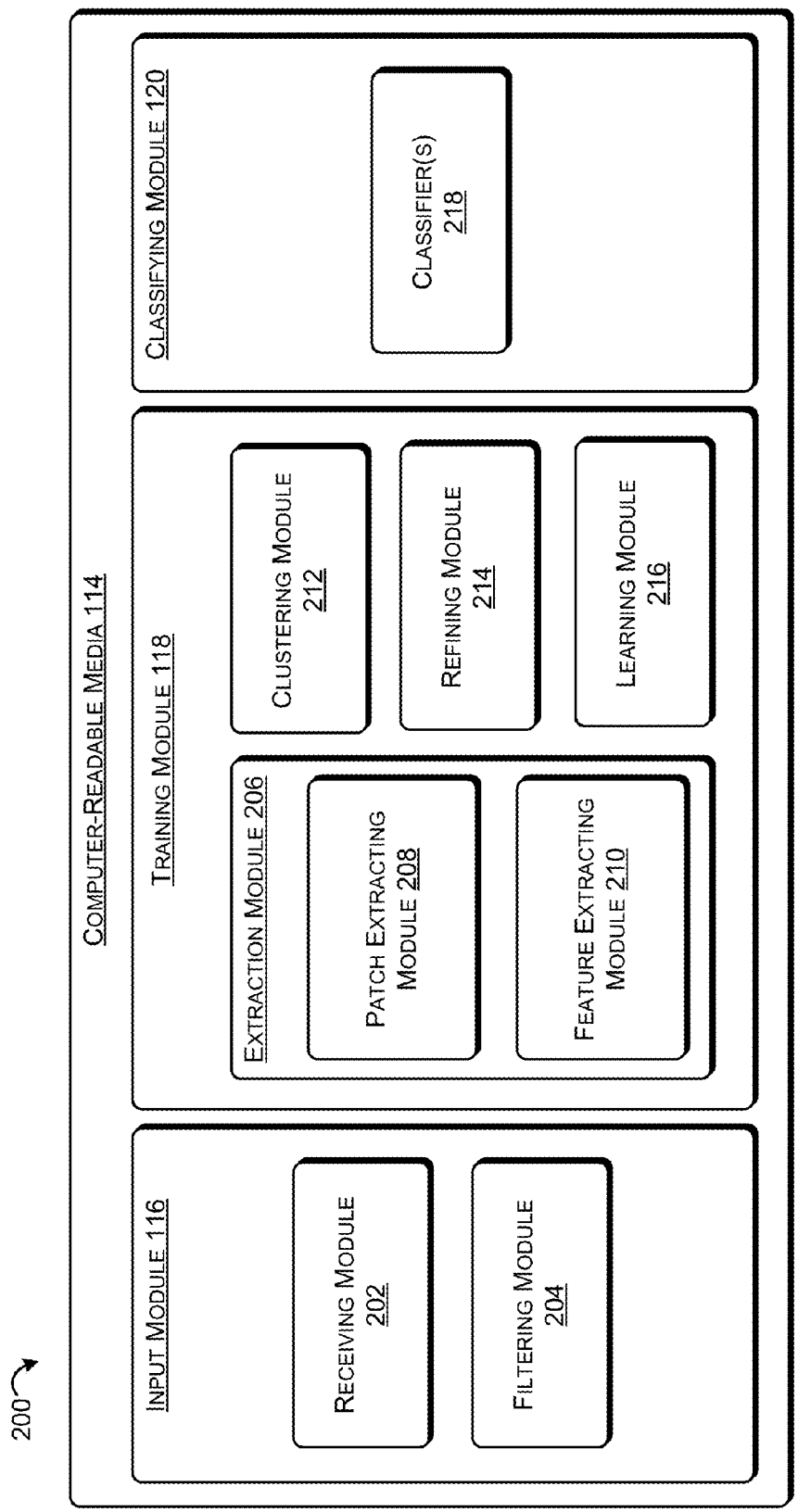
FIG. 2 is a diagram showing additional components of the example system for training classifiers from weakly supervised images and applying the trained classifiers to classify new images.

FIG. 2 is a diagram showing additional components of the example system 200 for training classifiers from weakly supervised images and applying the trained classifiers to classify new images. As shown in FIGS. 1 and 2, the system 200 may include the input module 116, the training module 118, and the classifying module 120.

The input module 116 may receive images and, in some examples, may remove at least some of the images using a filtering process described below. The input module 116 may include additional components or modules, such as a receiving module 202 and a filtering module 204.

In at least one example, the receiving module 202 may receive the plurality of images based at least in part on sending a query. A query may be a query for a single label or a plurality of labels. A query may be a textual query, image query, etc. For example, the query may include words used to identify a label (e.g., "orca whale") and related words and/or phrases (e.g., "killer whale," "blackfish," etc.). In at least one example, a user 106 may include optional modifiers to the query. For example, if a user wishes to use "jaguar" as a query, a user may modify the query "jaguar" to include "animal." In such examples, the resulting corpus of images may include jaguar animals but may exclude Jaguar® cars. The input module 116 may send the query to one or more search engines, social-networking services, blogging services, and/or other websites or web services. The receiving module 202 may receive the plurality of images based at least in part on sending the query.

In at least one example, the receiving module 202 may receive weakly supervised images. Weakly supervised images may include images associated with a label. However, the label may or may not correctly identify the subject matter of the image. Additionally, the label may identify the image or individual objects in the image, but the system described herein may not be able to determine which subject (e.g., the image or an individual object in the image) the label identifies. In contrast, supervised images may be labeled with a certainty above a predetermined threshold and unsupervised images may not be labeled at all. In additional or alternative examples, the techniques described herein may be applied to various types of multimedia data (e.g., videos, animations, etc.) and, in such examples, the receiving module 202 may receive various types of multimedia data items.

The weakly supervised images may be available on the Internet. For example, for any query associated with a label, weakly supervised images may be extracted from data available on the Internet in search engines, social-networking services, blogging services, data sources, and/or other websites or web services. Examples of search engines include Bing®, Google®, Yahoo! Search®, Ask®, etc. Examples of social-networking services include Facebook®, Twitter®, Instagram®, MySpace®, Flickr®, YouTube®, etc. Examples of blogging services include WordPress®, Blogger®, Squarespace®, Windows Live Spaces®, WeiBo®, etc. Examples of data sources include ImageNet (maintained by Stanford University), open video annotation project (maintained by Harvard University), etc.

In some examples, the weakly supervised images may be accessible by the public (e.g., data stored in search engines, public Twitter® pictures, public Facebook® pictures, etc.). However, in other examples, the weakly supervised images may be private (e.g., private Facebook® pictures, private YouTube® videos, etc.) and may not be viewed by the public. In such examples (i.e., when the weakly supervised images are private), the systems and methods described herein may not proceed without first obtaining permission from the authors of the weakly supervised images to access the image.

In the examples where the weakly supervised images are private or include personally identifiable information (PII) that identify or can be used to identify, contact, or locate a person to whom such images pertain, a user 106 may be provided with notice that the systems and methods herein are collecting PII. Additionally, prior to initiating PII data collection, users 106 may have an opportunity to opt-in or opt-out of the PII data collection. For example, a user 106 may opt-in to the PII data collection by taking affirmative action indicating that he or she consents to the PII data collection. Alternatively, a user 106 may be presented with an option to opt-out of the PII data collection. An opt-out option may require an affirmative action to opt-out of the PII data collection, and in the absence of affirmative user action to opt-out, PII data collection may be impliedly permitted.

As described above, labels correspond to queries. Labels may correspond to a descriptive term for a particular entity (e.g., animal, plant, attraction, etc.). Queries are textual terms or phrases that may be used to collect the corpus of images from search engines, social networks, etc. Typically, a label corresponds to a particular query, but in some examples, a label may correspond to more than one query.

For example, in such examples, the label "orca whale" may correspond to queries such as "orca whale," "killer whale," and/or "blackfish."

The plurality of images returned to the receiving module 202 may be noisy. Accordingly, the filtering module 204 may filter one or more images from the plurality of images to mitigate the noise in the images used for training classifiers. In additional or alternative examples, the receiving module 202 may receive new images for classifying by the trained classifiers.

The training module 118 may train classifiers from weakly supervised images. The training module 118 may include additional components or modules for training the classifiers. In at least one example, the training module 118 may include an extraction module 206, which includes a patch extracting module 208 and feature extracting module 210, a clustering module 212, a refining module 214, and a learning module 216.

As described above, the extraction module 206 may include a patch extracting module 208 and a feature extracting module 210. The patch extracting module 208 may access a plurality of images from the receiving module 202 and extract one or more patches from individual images of the plurality of images. As described above, patches may represent regions or parts of an image. Individual patches may correspond to an object or a portion of an object in an image. In some examples, there may be multiple patches in an individual image.

The feature extracting module 210 may extract global features and patch-based features. Additionally, the feature extracting module 210 may extract patch representations from the patches. Leveraging global features and patch-based features improves accuracy in recognizing and classifying objects in images. The patch representations may be leveraged for refining the patches, as described below.

Global feature extraction may describe the process of identifying interesting portions or shapes of images and extracting those features for additional processing. The process of identifying interesting portions or shapes of images may occur via common multimedia feature extraction techniques such as SIFT (scale-invariant feature transform), deep neural networks (DNN) feature extractor, etc. In at least one example, multimedia feature extraction may describe turning an image into a high dimensional feature vector. For example, all information provided may be organized as a single vector, which is commonly referred to as a feature vector. In at least one example, each image in the corpus of images may have a corresponding feature vector based on a suitable set of features. Global features may include visual features, textual features, etc. Visual features may range from simple visual features, such as edges and/or corners, to more complex visual features, such as objects. Textual features include tags, classes, and/or metadata associated with the images.

Patch-based feature extraction may describe extracting image-level features based at least in part on patches extracted from an image. In at least one example, the patch-based features may be based at least in part on patches in refined clusters of patches, as described below. In some examples, patch-based features are similar to mid-layer representations in DNNs. Patch-based features may represent a patch distribution over the patch dictionary, described below. Patch-based features enable the systems described herein to train classifiers using less data, therefore increasing efficiency and reducing computational resources consumed for training. Various models that linearly transform a feature space associated with the images may be used to extract patch-based features, such as latent Dirichlet allocation (LDA), Support Vector Machines (SVM), etc.

The feature extracting module 210 may also extract patch representations. Patch representations describe features extracted from individual patches. As described above, patch representations may represent patch-level features and may be used for refining the clusters. Various models may be used to extract patch representations, such as but not limited to, LDA representations of HOG, etc.

The clustering module 212 may arrange the patches in clusters based on the patch-based features. In at least some examples, to increase the speed of processing the images for training classifiers, the clustering module 212 may arrange the individual patches into a plurality of clusters based at least in part on the patch-based features, as described above. Patches may be placed in a same cluster based at least in part on over-clustering the LDA representation of the patches associated with an image to generate the clusters. Aspect ratio may be implicitly captured by the patch-based features. In some examples, each cluster may represent a particular label. In other examples, each cluster may represent various views of a particular cluster. In additional or alternative examples, the clustering module 212 may use different methods of vector quantization including K-Means clustering to arrange the clusters of patches.

The refining module 214 may remove patches from individual clusters based at least in part on similarity values that are representative of a similarity between individual patches. The refining module 214 may determine the similarity values, as described below. The similarity values may be used to determine entropy values and the entropy values may be used for processing the patches via diversity selection, as described below. Entropy values may represent certainty measures. One or more patches may be removed from individual clusters based at least in part on the entropy values and diversity selection. Following the removal of patches from the individual clusters, the remaining patches may have lower entropy values and/or more diversity than the patches in the pre-processed clusters. The resulting clusters may be refined clusters of patches used for training classifiers to classify images.

The learning module 216 may leverage one or more learning algorithms to train classifiers for one or more labels associated with the refined clusters of patches. The feature extracting module 210 may extract patch-based features from the patches in the refined clusters of patches. The classifiers may be trained based at least in part on the extracted patch-based features and, in at least some examples, global features. For example, learning algorithms such as fast rank, Stochastic Gradient Descent (SGD), SVMs, boosting, etc., may be applied to learn a classifier for identifying particular labels of the one or more labels. In at least some examples, classifiers for all of the labels may be trained at the same time using multi-label learning techniques, such as multiclass SVM or SGD. In other examples, the training described above may be applied to new labels as new labels are received and the new classifiers may be added to the classifier(s) 218.

The classifying module 120 may store the classifier(s) 218. The classifying module 120 may receive patches and patch-based features extracted from new images and may apply the classifier(s) 218 to the patch-based features. The classifying module 120 may output results including labels identifying and/or classifying images. In at least some examples, the output results may include confidence scores corresponding to each label.

Example Processes

Figure 3:
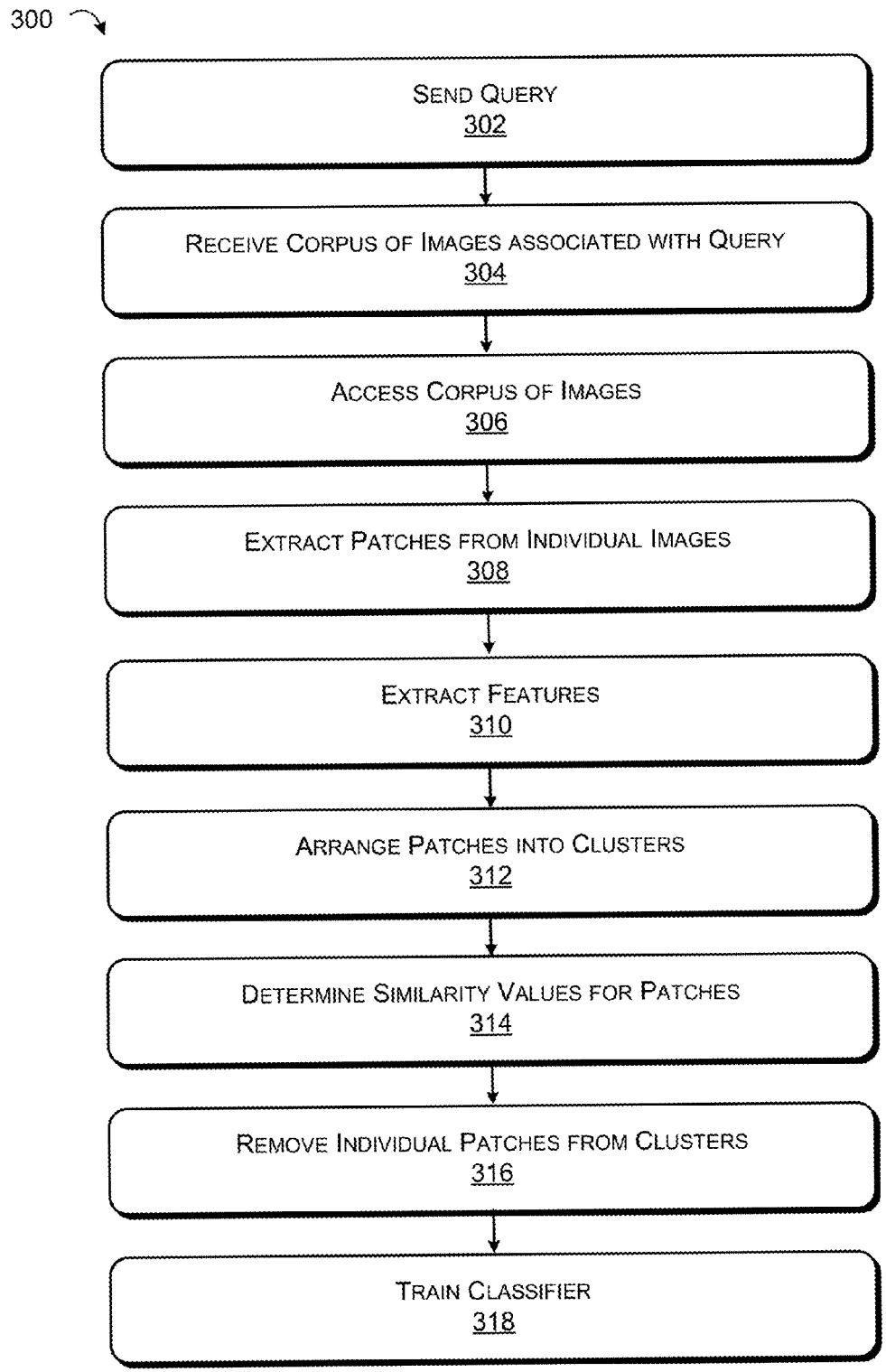
FIG. 3 illustrates an example process for training classifiers from patch-based features.
Figure 4:
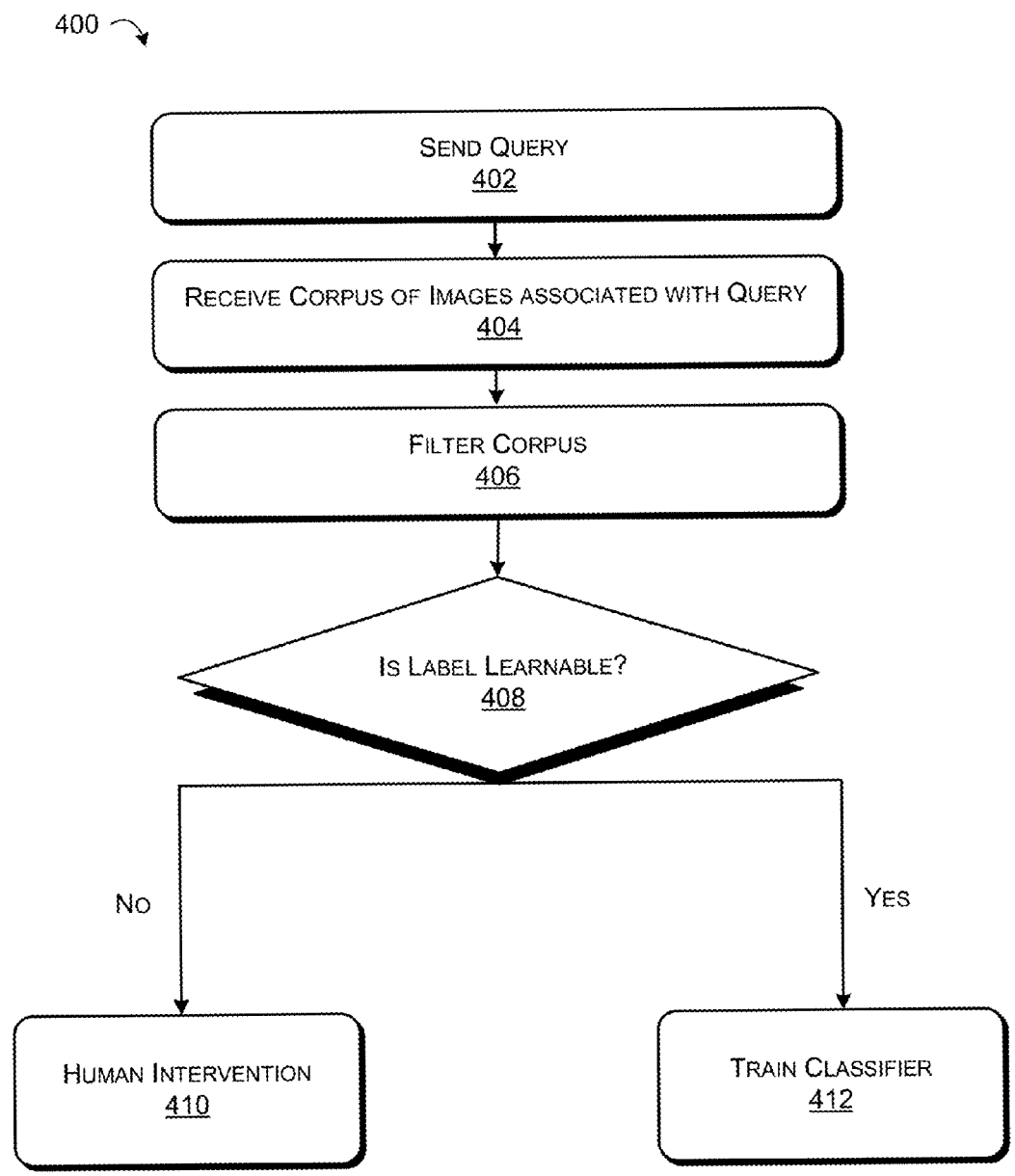
FIG. 4 illustrates an example process for determining whether a label is learnable based at least in part on filtering a corpus of images.
Figure 5:
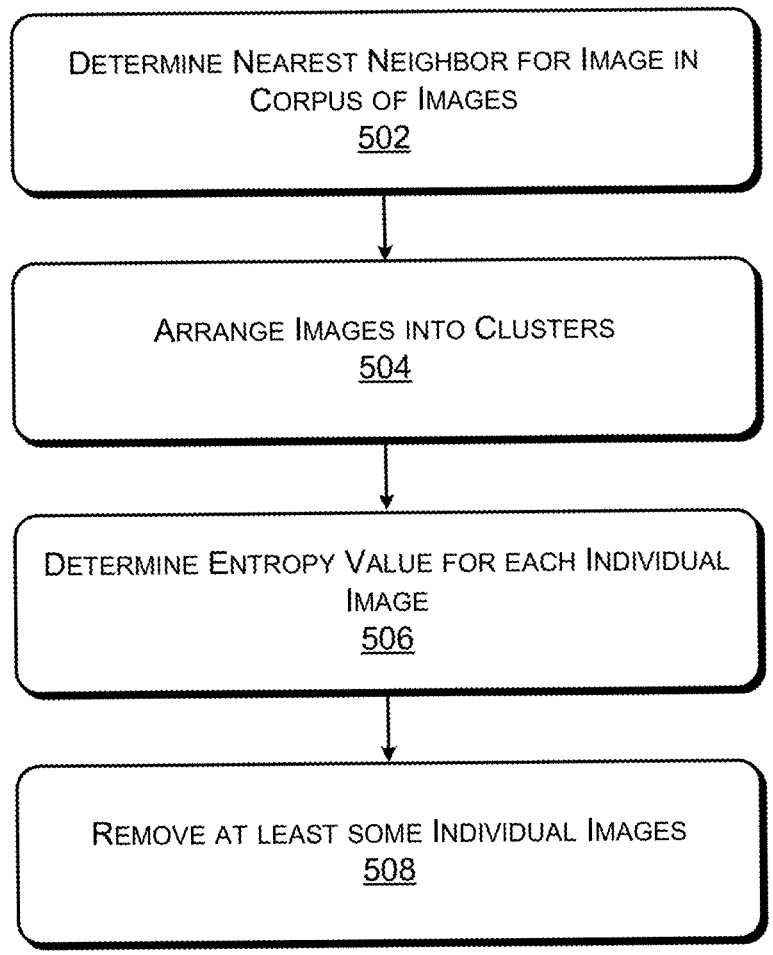
FIG. 5 illustrates an example process for filtering a corpus of images.

FIGS. 3-5 describe example processes for training classifiers from weakly supervised images. The example processes are described in the context of the environment of FIGS. 1 and 2 but are not limited to those environments. The processes are illustrated as logical flow graphs, each operation of which represents an operation in the illustrated or another sequence of operations that may be implemented in hardware, software, or a combination thereof. In the context of software, the operations represent computer-executable instructions stored on one or more computer-readable media 114 that, when executed by one or more processors 112, configure a computing device to perform the recited operations. Generally, computer-executable instructions include routines, programs, objects, components, data structures, and the like that configure a computing device to perform particular functions or implement particular abstract data types.

The computer-readable media 114 may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions, as described above. Finally, the order in which the operations are described is not intended to be construed as a limitation, and any number of the described operations may be combined in any order and/or in parallel to implement the process.

FIG. 3 illustrates an example process 300 for training classifiers from patch-based features.

Block 302 illustrates sending a query. In at least some examples, training classifiers may begin with the input module 116 sending a query, as described above.

Block 304 illustrates receiving a corpus of images associated with the query. Based at least in part on sending the query, images relating to the query may be returned to the receiving module 202 from the one or more search engines, social-networking services, blogging services, and/or other websites or web services, as described above. Additional queries associated individual labels of a set of labels may be sent to the one or more search engines, social-networking services, blogging services, and/or other websites or web services as described above, and corresponding images may be returned and added to the corpus of images for training classifier(s) 218. In some examples, the corpus may be noisy and may include images that are unrelated to the queries, are of low quality, etc. Accordingly, the corpus of images may be refined. In at least some examples, the filtering module 204 may filter individual images from the corpus of images, as described below in FIGS. 4-6.

Block 306 illustrates accessing a corpus of images. The extraction module 206 may access the corpus of images from the input module 116 for processing. In at least some embodiments, the corpus of images may be filtered before proceeding with processing the individual images from the corpus of images. Example processes for filtering are described in FIGS. 4-6.

Block 308 illustrates extracting patches from individual images. As described above, patches may represent regions or parts of an image. Individual patches may correspond to an object or a portion of an object in an image. In some examples, there may be multiple patches in each image. The patch extraction module 208 may leverage edge detection to extract patches that correspond to objects or portions of objects in images. In at least one example, the patch extraction module 208 may use structured edge detection and/or fast edge detection (e.g., via structured random forests, etc.). In other examples, the patch extraction module 208 may extract patches based at least in part on detecting edges using intensity, color gradients, classifiers, etc.

Block 310 illustrates extracting features. As described above, the feature extracting module 210 may extract global features and/or patch-based features from the individual images and may extract patch representations from the patches. The global features may represent contextual information extracted from individual images. The patch-based features may represent distinguishing features of the patches associated with individual images. Patch representations may represent distinguishing features a particular patch.

Block 312 illustrates arranging the patches into clusters. In at least some examples, to increase the speed of processing the images for training classifiers, the clustering module 212 may arrange the individual patches into a plurality of clusters based at least in part on the patch-based features, as described above. For each cluster, the clustering module 212 may determine a canonical size. The clustering module 212 may predetermine and cache the $\Sigma^{-1}$ for the LDA. The predetermined canonical size may be leveraged for determining similarity values, as described below.

Block 314 illustrates determining similarity values for the patches. The refining module 214 may remove at least some of the individual patches from individual clusters of the plurality of clusters based at least in part on similarity values. The refining module 214 may determine similarity values that are representative of a similarity between two individual patches, the determining may be based at least in part on the patch representations. In at least one example, the refining module 214 may leverage HOG for the LDA features. The refining module 214 may determine similarity values by standardizing the patch representations (e.g., LDA HOG) extracted from a first individual patch of the individual patches and a second individual patch of the individual patches to a predetermined canonical size. In at least one example, the patch representations (e.g., LDA HOG) may be standardized by zero padding the patch representations extracted from the first individual patch and the second individual patch. In some examples, the first individual patch is part of a particular cluster of the plurality of patches associated with a label and the second individual patch is part of a different cluster of the plurality of patches associated with a different label of the plurality of labels. That is, in some examples, similarity values may be determined for patches in different clusters via intercluster comparisons. In other examples, the first individual patch and the second individual patch are part of a same cluster of the plurality of clusters, the same cluster associated with a same label of the plurality of labels. That is, in some examples, similarity values may be determined for patches in the same cluster via intracluster comparisons.

The refining module 214 may compute a dot product based at least in part on the standardized patch representations of the first individual patch and the second individual patch. In at least one example, weight vectors derived from the LDA feature extraction of the patches may be used for computing the dot product. In other examples, the refining module 214 may approximate the dot product by a Euclidean distance comparison. Leveraging the Euclidean distance enables the refining module 214 to use an index (e.g., k-dimensional tree) for nearest neighbor determinations for identifying patches that have low entropy values and high diversity, as described below. In some examples, the patches in the index may be stored and new patches provided during training and/or classifying may be compared to patches in the index for quickly and efficiently determining similarity (e.g., calculating similarity values) between the patches.

Block 316 illustrates removing individual patches from the clusters. As described above, the refining module 214 may remove at least some of the individual patches from individual clusters of the plurality of clusters based at least in part on the similarity values. In at least some examples, the refining module 214 may remove at least some of the individual patches based at least in part on entropy values and diversity selection. To determine whether a particular patch has a high entropy value or a low entropy value, the refining module 214 may access a plurality of individual patches in a particular cluster of the plurality of clusters. The particular cluster may be associated with a label of the plurality of labels. The refining module 214 may process the individual patches to determine top nearest neighbors, as described above. In at least one example, the individual patches may be iteratively processed. As the individual patches are processed, a predetermined number of top nearest neighbors may be selected for training the classifier(s) 218 (and those patches that are not selected are removed from the clusters). In some examples, specific data structures may be leveraged that increase the speed in which nearest neighbors may be determined. In at least one example, the specific data structures may incorporate a cosine similarity metric that may be approximated by Euclidean distance. Accordingly, nearest neighbor determination may be accelerated by leveraging an index (e.g., k-dimensional tree) for all of the patches and approximating nearest neighbors using the index.

The refining module 214 may determine an entropy value for each of the individual patches based at least in part on determining labels associated with the nearest neighbors within a cluster. The refining module 214 may leverage the nearest neighbor determinations to generate distributions for labels that may be representative of entropy values for individual patches. If a particular individual patch and a nearest neighbor patch are associated with a same label, the refining module 214 may assign a low entropy value (e.g., close to 0) based at least in part on a low entropy distribution. The low entropy value (e.g., close to 0) may indicate that the particular individual patch and the nearest neighbor patch are highly representative of the label. Conversely, if the particular individual patch and the nearest neighbor patch are associated with different labels, the refining module 214 may assign a high entropy value (e.g., close to 1) based at least in part on a high entropy distribution. The high entropy value (e.g., close to 1) may indicate that the particular individual patch and the nearest neighbor patch are not representative of a same label. The refining module 214 may remove all individual patches with entropy values above a predetermined threshold to ensure the training data is highly representative of the label.

The refining module 214 may also remove patches that reduce the diversity of the patches. The resulting patches may be arranged in a dictionary that is diverse and has a number of patches below a predetermined threshold. Patches may be diverse if the patches are representative of various portions of an object and/or various views of an object identified by the label. In some examples, the dictionary may be stored and new patches may be added to the dictionary over time. The dictionary of patches may be used to generate patch representations.

The refining module 214 may perform diversity selection by ordering individual patches in the dictionary based at least in part on the entropy value associated with each of the individual patches. Then, in a plurality of iterations, the refining module 214 may process the ordered individual patches by determining nearest neighbor patches for each individual patch of the ordered individual patches. The refining module 214 may select a particular patch if the particular patch has a threshold number of nearest neighbors with entropy values below a predetermined value. The refining module 214 may remove nearest neighbor patches to the particular patch following each iteration.

Based at least in part on the refining module 214 removing individual patches with entropy values above a predetermined threshold and individual patches to maximize the diversity of the individual patches, the refining module 214 may further refine the remaining patches for efficiency. For instance, suppose the patches are associated with a predetermined number of labels (e.g., E), the refining module 214 may group the patches from each label into clusters (e.g., $P_i, \ldots, P_E$). In at least one example, the individual patches selected for processing in each cluster (e.g., $P_i, \ldots, P_E$) may be ordered based on a corresponding entropy value and grouped into sub-clusters A final group of patches (e.g., F) for training the classifier may be iteratively selected to maximize the efficiency and accuracy of classification. The recognition and/or classification performance (e.g., $m_{pv}$) may be measured using the following example algorithm or algorithms similar to the example algorithm below.

$[b_1, \ldots, b_E]$=counters indicating which subset of $P_i$ is being processed.

For t=1 . . . T (iterations)
  $s_t$=argmax $m_{pv}(F \cup P_i^{b_i})$
  $F=F \cup P_i^{s_t}$
  $b_{s_t}=b_{s_t}+1$.

Block 318 illustrates training a classifier. The learning module 216 may train one or more classifiers 218 for the plurality of labels based at least in part on patches in the refined plurality of clusters. The classifiers 218 may be trained based at least in part on patch-based features extracted from the patches in the refined clusters and, in at least some examples, global features. For example, learning algorithms such as fast rank, SGD, SVM, boosting, etc., may be applied to learn a classifier for identifying particular labels of the one or more labels. In at least some examples, classifiers for all of the labels may be trained at the same time using multi-label learning techniques, such as multi-class SVM or SGD. In other examples, the training described above may be applied to new labels as new labels are received and the new classifiers may be added to the classifier(s) 218.

FIG. 4 illustrates an example process 400 for determining whether a label is learnable based at least in part on filtering a corpus of images.

Block 402 illustrates sending a query, as described above. Block 404 illustrates receiving a corpus of images associated with the query, as described above.

Block 406 illustrates filtering the corpus of images. In some examples, the corpus of images may be noisy and may include images that are unrelated to the queries, are of low quality, etc. Accordingly, the corpus of images may be refined. In at least some examples, the filtering module 204 may filter individual images from the corpus of images, as described in FIGS. 5-6 below. In addition to the processes described below, the filtering module 204 may apply specific filters to remove specifically identified images from the corpus of images. For instance, the filtering module 204 may remove cartoon images, images with human faces covering a predetermined portion of the image, images with low gradient intensity, etc.

Block 408 illustrates determining whether a label is learnable. If removing images from the corpus results in a number of images below a predetermined threshold, the filtering module 204 may determine that the label is not learnable and may turn to human intervention, as illustrated in Block 410. Conversely, if removing images from the corpus results in a number of images above a predetermined threshold, the filtering module 204 may determine that the label is learnable and may proceed with training classifier(s) 218 as illustrated in Block 412. An example process of training classifier(s) 218 is described in FIG. 3, above.

FIG. 5 illustrates an example process 500 for filtering a corpus of images.

Block 502 illustrates determining nearest neighbors for each image in the corpus of images. For each label of the plurality of labels, the filtering module 204 may arrange each of the images in the corpus of images into a k-dimensional tree for facilitating nearest neighbor lookup. For each image, the facilitating module 204 may determine a predetermined number of nearest neighbors. The filtering module 204 may leverage global features extracted from individual images for determining the nearest neighbors. The filtering module 204 may determine how many times a particular individual image appears in the neighborhood of any individual image. If the particular individual image appears below a predetermined number of times, the particular individual image may be removed from the corpus of images.

Block 504 illustrates arranging individual images into clusters. The filtering module 204 may cluster the individual images into clusters corresponding to individual labels of the plurality of labels. The filtering module 204 may use single linkage clustering and may arrange individual images within a predetermined distance into a predetermined number of clusters.

Block 506 illustrates determining entropy values for each individual image in the cluster. The filtering module 204 may process the clusters to determine nearest neighbors of an image. For each image in a particular cluster, the filtering module 204 may determine the nearest neighbors of an image in other clusters. The filtering module 204 may determine entropy values based at least in part on comparing the nearest neighbors to one another. If nearest neighbors to a particular cluster are stable (e.g., low entropy value), the particular cluster is likely stable and representative and/or distinctive of a label. However, if nearest neighbors to a particular cluster are unstable (e.g., high entropy value), the particular cluster is likely unstable and not representative or distinctive of a label.

Block 508 illustrates removing at least some individual images. The filtering module 204 may remove individual images having entropy values above a predetermined threshold.

Figure 6:
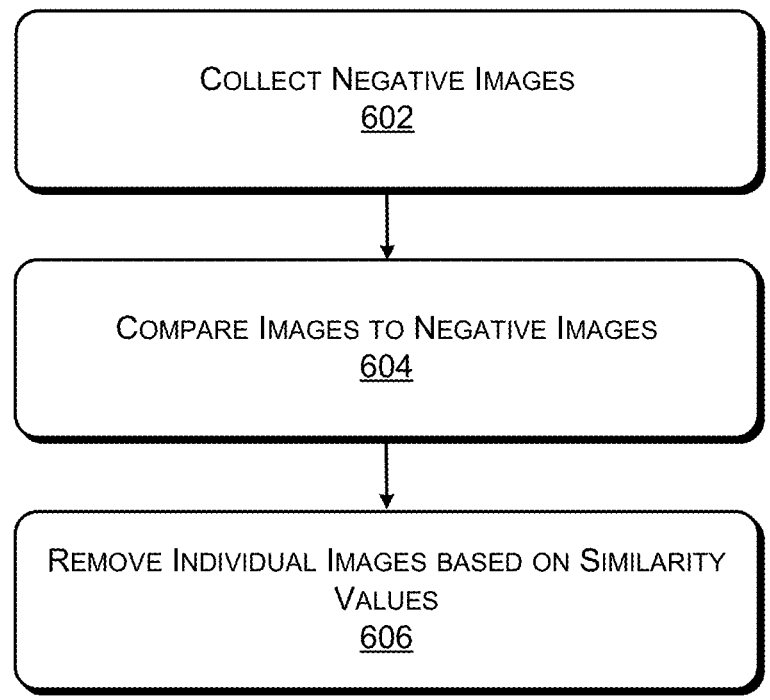
FIG. 6 illustrates another example process for filtering a corpus of images.

FIG. 6 illustrates another example process 600 for filtering a corpus of images.

Block 602 illustrates collecting negative images. A negative image is an image that is known to be excluded from training data associated with a label. In at least some examples, the receiving module 202 may perform two or more queries. At least one query may be a query for a particular label as described above (e.g., CenturyLink Field). Additional queries may include queries for individual words that make up a particular label having two or more words (e.g., CenturyLink, Field). An initial query of the additional queries may include a first word of the two or more words (e.g., CenturyLink). Each additional query of the additional queries may include each additional word of the two or more words (e.g., Field). The receiving module 202 may receive results from the two or more queries. The results returned for at least the second query may represent the negative images. In other examples, the receiving module 202 may leverage a knowledge graph (e.g., Satori, etc.) for collecting negative images.

Block 604 illustrates comparing images to negative images. The filtering module 204 may compare individual images returned as a result of the first query to the individual images returned in the additional queries to determine similarity values as described above.

Block 606 illustrates removing individual images from the corpus of images based on similarity values. The filtering module 204 may remove individual images with similarity values above a predetermined threshold. That is, if individual images are too similar to negative images, the individual images may be removed from the corpus.

Figure 7:
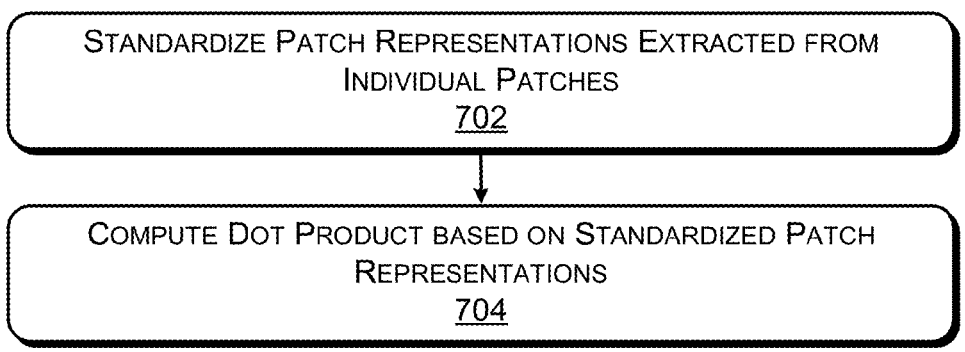
FIG. 7 illustrates an example process for determining similarity values.

FIG. 7 illustrates an example process 700 for determining similarity values. As described above, the refining module 214 may determine similarity values representative of a similarity between the individual patches. The similarity values may be determined based at least in part on the patch representations. In at least one example, the refining module 214 may leverage HOG for the LDA features.

Block 702 illustrates standardizing patch representations extracted from individual patches. In at least some examples, to increase the speed of processing the images for training classifiers, the refining module 214 may arrange a plurality of patches into clusters based on an aspect ratio of the patches. The refining module 214 may determine similarity values by standardizing patch representations (e.g., LDA HOG) extracted from a first individual patch of the individual patches and a second individual patch of the individual patches to a predetermined canonical size. In at least one example, the patch representations (e.g., LDA HOG) may be standardized by zero padding the patch representations extracted from the first individual patch and the second individual patch.

Block 704 illustrates computing a dot product based on standardized patch representations. Based at least in part on standardizing the patch representations, the refining module 214 may compute a dot product based at least in part on the standardized values of the first individual patch and the second individual patch. In at least one example, weight vectors derived from the LDA feature extraction may be used for computing the dot product. In other examples, the refining module 214 may approximate the dot product by a Euclidean distance comparison. Leveraging the Euclidean distance enables the refining module 214 to use a k-dimensional tree for nearest neighbor determinations for identifying patches that have low entropy values and high diversity, as described below.

Figure 8:
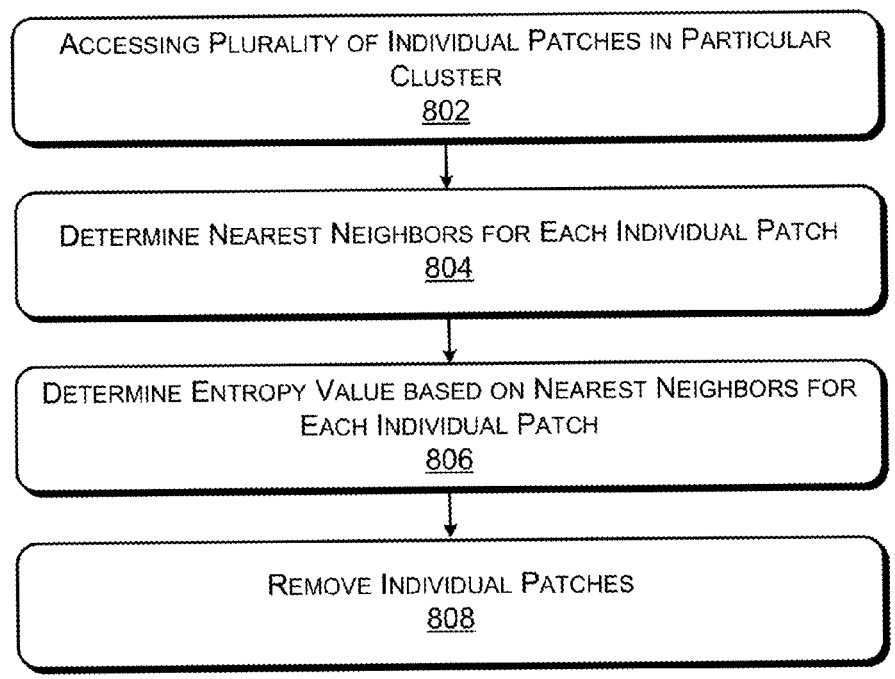
FIG. 8 illustrates an example process for removing patches from clusters of patches.

FIG. 8 illustrates an example process 800 for removing patches from clusters of patches. As described above, the refining module 214 may remove at least some of the individual patches from individual clusters of the plurality of clusters based at least in part on similarity values. In at least some examples, the refining module 214 may remove at least some of the individual patches based at least in part on entropy values and diversity selection.

Block 802 illustrates accessing the plurality of individual patches in a particular cluster. To determine whether a particular patch has a high entropy value or a low entropy value, the refining module 214 may access a plurality of individual patches in a particular cluster of the plurality of clusters. The particular cluster may be associated with a label of the plurality of labels.

Block 804 illustrates determining nearest neighbors for each individual patch. The refining module 214 may process the individual patches to determine top nearest neighbors, as described above. In at least one example, the individual patches may be iteratively processed. As the individual patches are processed, a predetermined number of top nearest neighbors may be selected for training the classifiers 218. In some examples, specific data structures may be leveraged that increase the speed in which nearest neighbors may be determined. In at least one example, the specific data structures may incorporate a cosine similarity metric that may be approximated by Euclidean distance. Accordingly, nearest neighbor determination may be accelerated by leveraging a k-dimensional tree for all of the patches and approximating nearest neighbors using the k-dimensional tree.

Block 806 illustrates determining an entropy value based on nearest neighbors for each individual patch. The refining module 214 may determine an entropy value for each of the individual patches based at least in part on determining the nearest neighbors within a cluster. If a particular individual patch and a nearest neighbor patch are associated with a same label, the refining module 214 may assign a low entropy value (e.g., close to 0). The low entropy value (e.g., close to 0) may indicate that the particular individual patch and the nearest neighbor patch are highly representative of the label. Conversely, if the particular individual patch and the nearest neighbor patch are associated with different labels, the refining module 214 may assign a high entropy value (e.g., close to 1), indicating that the particular individual patch and the nearest neighbor patch are not representative of a same label.

Block 808 illustrates removing individual patches from the clusters of patches. The refining module 214 may remove individual patches based at least in part on entropy values and/or diversity selection. The refining module 214 may remove individual patches with entropy values above a predetermined threshold to ensure the training data is highly representative of the label. The refining module 214 may also remove patches that reduce the diversity of the patches. Patches may be diverse if the patches are representative of various portions of an object and/or various views of an object identified by the label. The refining module 214 may perform diversity selection by ordering individual patches based at least in part on the entropy value associated with each of the individual patches. Then, in a plurality of iterations, the refining module 214 may process the ordered individual patches by determining nearest neighbor patches for each individual patch of the ordered individual patches. The refining module 214 may remove nearest neighbor patches from the cluster following each iteration. The refining module 214 may select a particular patch if the particular patch had a number of nearest neighbors above a predetermined threshold with entropy values below a predetermined threshold.

Figure 9:
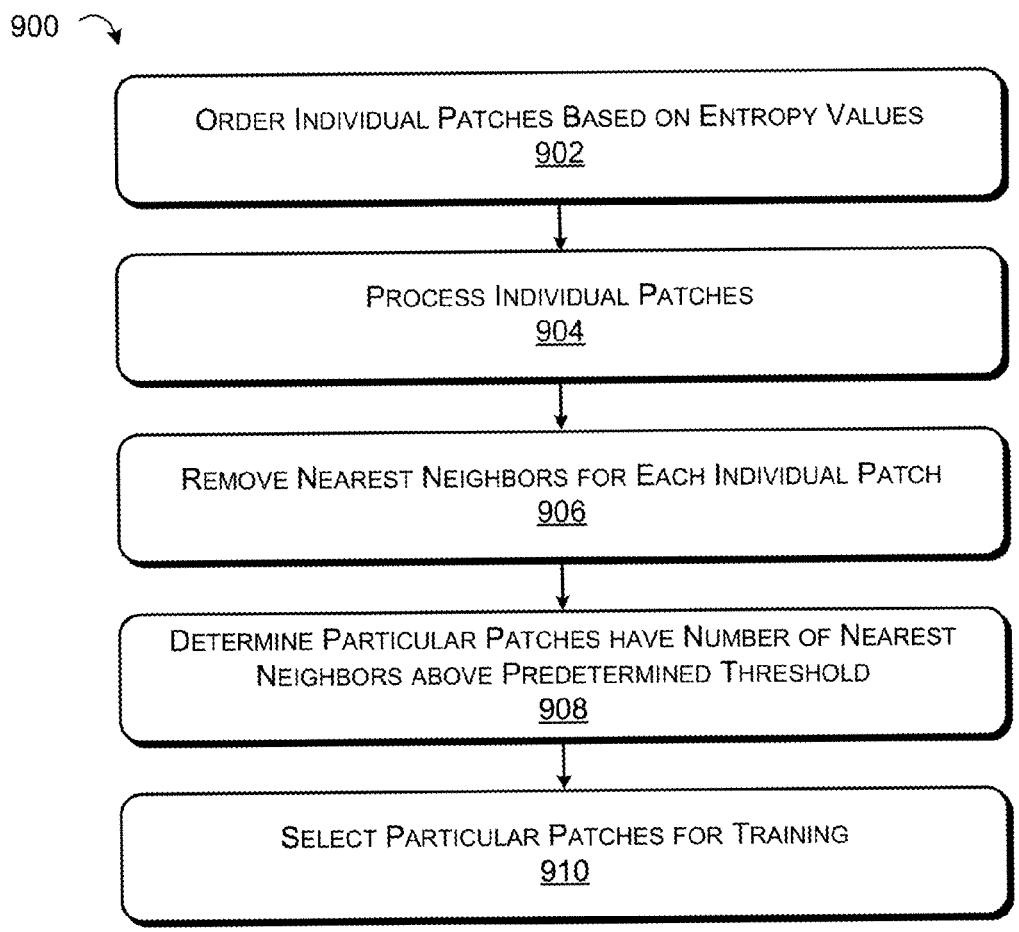
FIG. 9 illustrates an example process for diversity selection of particular patches for training.

FIG. 9 illustrates an example process 900 for diversity selection of particular patches for training the classifier(s) 218. As described above, the refining module 214 may also remove patches that reduce the diversity of the patches. Patches may be diverse if the patches are representative of various portions of an object and/or various views of an object identified by the label.

Block 902 illustrates ordering individual patches based on entropy values. The refining module 214 may perform diversity selection by ordering individual patches based at least in part on the entropy value associated with each of the individual patches.

Block 904 illustrates processing individual patches. In a plurality of iterations, the refining module 214 may process the ordered individual patches by determining nearest neighbor patches for each individual patch of the ordered individual patches.

Block 906 illustrates removing nearest neighbors for each individual patch. The refining module 214 may remove nearest neighbor patches from the cluster following each iteration.

Block 908 illustrates determining particular patches having a number of nearest neighbors above a predetermined threshold with entropy values below a predetermined threshold. The refining module 214 may determine particular patches have a number of nearest neighbors above a predetermined threshold with entropy values below a predetermined threshold.

Block 910 illustrates selecting particular patches for training the classifier(s) 218. The refining module 214 may select a particular patch if the particular patch had a number of nearest neighbors above a predetermined threshold with entropy values below a predetermined threshold. Based at least in part on the refining module 214 removing individual patches with entropy values above a predetermined threshold and individual patches to maximize the diversity of the individual patches, the refining module 214 may further refine the remaining patches for efficiency. In at least one example, the individual patches selected for processing in each cluster may be ordered based on a corresponding entropy value and grouped into sub-clusters. A final group of patches may be for training the classifier may be iteratively selected to maximize efficiency and accuracy of classification. The feature extracting module 210 may extract patch-based features from the final group of patches (e.g., refined cluster of patches) for use in training the classifiers.

Applying the Classifiers

Figure 10:
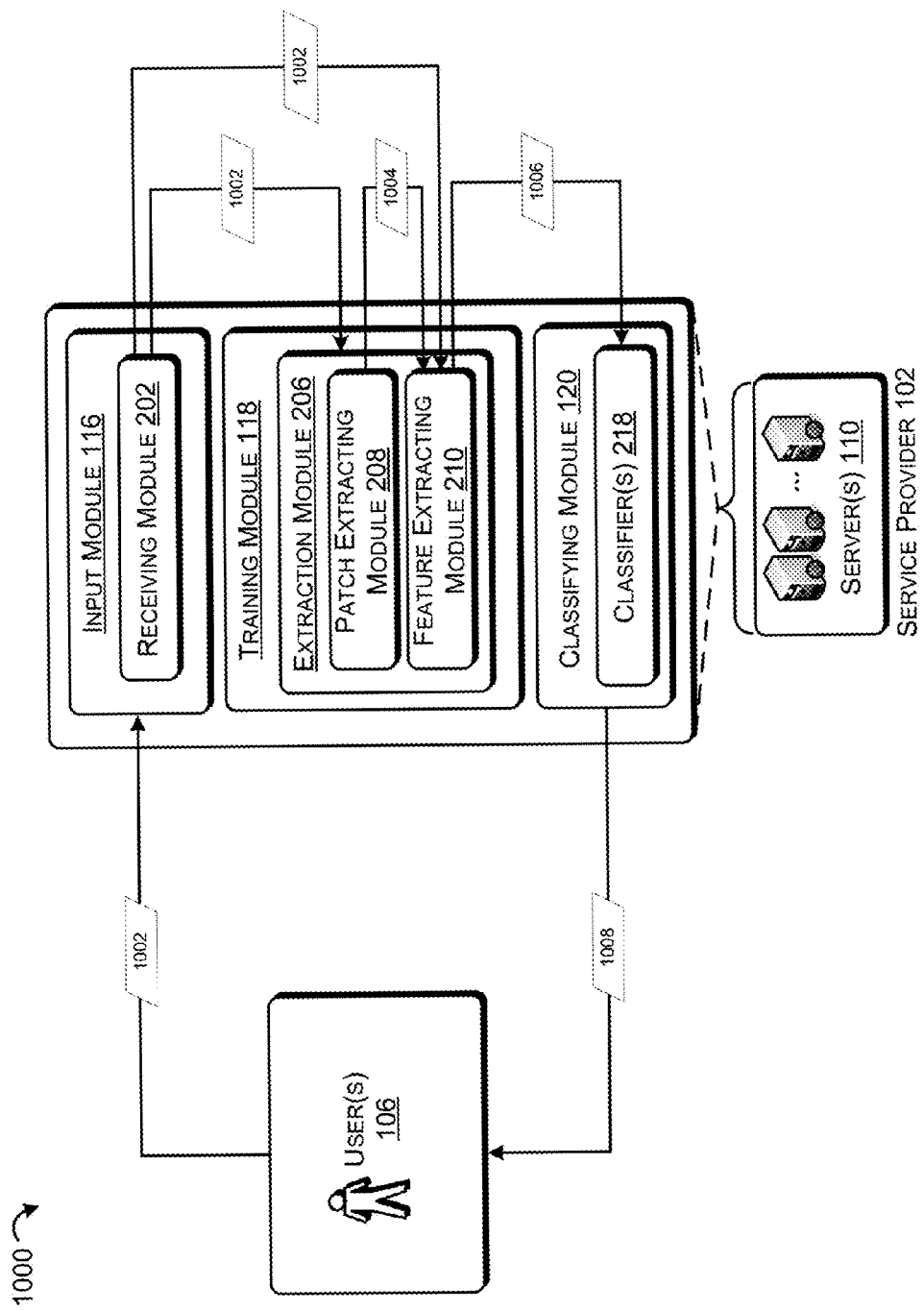
FIG. 10 illustrates a diagram showing an example system for classifying a new image.

FIG. 10 illustrates a diagram showing an example system 1000 for classifying a new image. As shown in FIG. 10, the system 1000 may include the input module 116, training module 118, and classifying module 120.

The input module 116 may include the receiving module 202. The receiving module 202 may receive a new image 1002 for classifying. The user(s) 106 may input one or more images into the receiving module 202 via one of the user devices 108. For example, in at least one example, a user 106 may select an image stored on his or her user device 108 for input into the input module 116. In another example, a user 106 may take a photo or video via his or her user device 108 and input the image into the input module 116.

The receiving module 202 may send the new image 1002 to the extraction module 206 stored in the training module 118. The patch extraction module 208 that is stored in the extraction module 208 may extract patches from the new image 1002, as described above. The patch extracting module 208 may send the patches 1004 to the feature extracting module 210 for extracting patch-based features from the image 1002, based at least in part on the patches 1004, as described above. The feature extracting module 210 may send the patch-based features 1006 to the classifying module for classifying by the classifier(s) 218. The classifying module 120 may apply the classifier(s) 218 to the patch-based features 1006 for classification. The classifying module 120 may send the classified result 1008 to the user(s) 106. In at least one example, the classified result 1008 may include a confidence score.

Example Processes

The example process 1100 is described in the context of the environment of FIGS. 1, 2, and 10 but is not limited to those environments. The process 1100 is illustrated as a logical flow graph, each operation of which represents an operation in the illustrated or another sequence of operations that may be implemented in hardware, software, or a combination thereof. In the context of software, the operations represent computer-executable instructions stored on one or more computer-readable media 114 that, when executed by one or more processors 112, configure a computing device to perform the recited operations. Generally, computer-executable instructions include routines, programs, objects, components, data structures, and the like that configure a computing device to perform particular functions or implement particular abstract data types.

The computer-readable media 114 may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions, as described above. Finally, the order in which the operations are described is not intended to be construed as a limitation, and any number of the described operations may be combined in any order and/or in parallel to implement the process.

Figure 11:
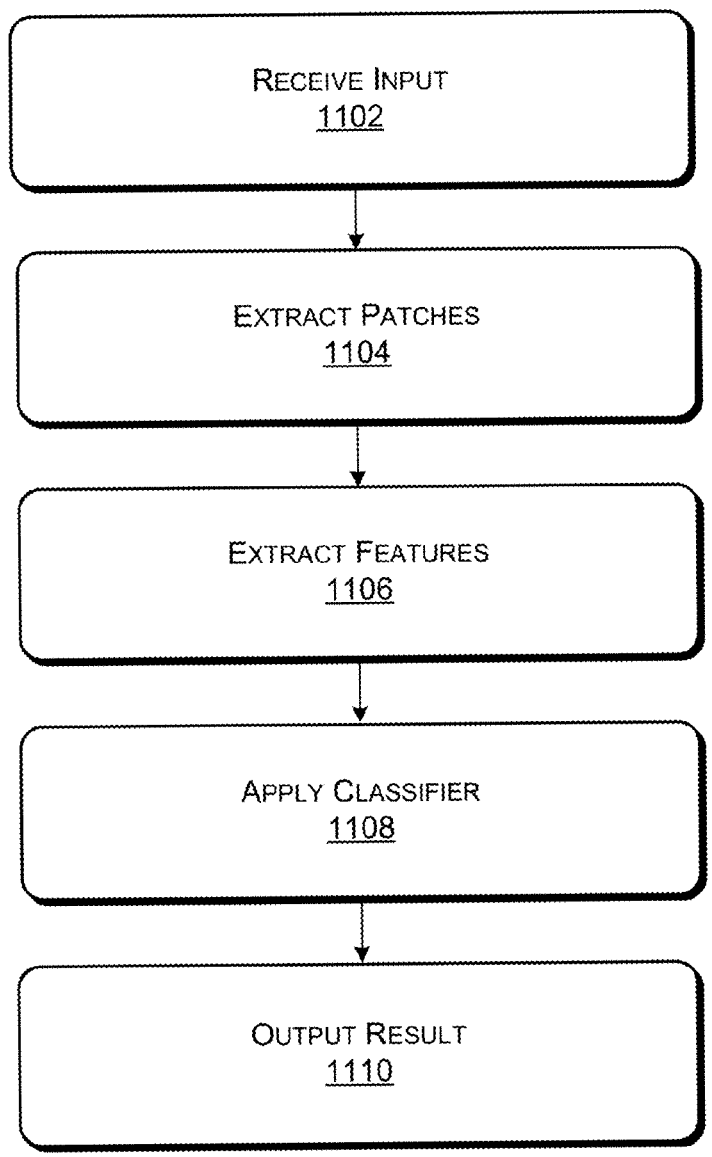
FIG. 11 illustrates an example process for classifying a new image.

FIG. 11 illustrates an example process 1100 for classifying a new image 1002.

Block 1102 illustrates receiving input. The receiving module 202 may receive a new image 1002 to be classified. As described above, the user(s) 106 may input one or more images into the receiving module 202 via one of the user devices 108.

Block 1104 illustrates extracting patches 1004. The patch extraction module 208 may extract patches 1004 from the new image 1002, as described above.

Block 1106 illustrates extracting features 1006. The patch extracting module 208 may send the patches 1004 to the feature extracting module 210 for extracting patch-based features 1006 from the image 1002, based at least in part on the extracted patches 1004, as described above.

Block 1108 illustrates applying a classifier 218. The feature extracting module 210 may send the patch-based features 1006 to the classifying module for classifying by the classifier(s) 218. The classifying module 120 may apply the classifier(s) 218 to the patch-based features 1006 for classification.

Block 1110 illustrates outputting the result 1008. The classifying module 120 may send the classified result 1008 to the user(s) 106.

A. A computer-implemented method comprising: accessing a corpus of images, wherein individual images of the corpus are associated with at least one label of a plurality of labels; extracting one or more patches from the individual images; extracting patch-based features from the one or more patches; extracting patch representations from individual patches of the one or more patches; arranging the individual patches into a plurality of clusters based at least in part on the patch-based features, wherein individual clusters of the plurality of clusters correspond to individual labels of the plurality of labels; determining similarity values representative of a similarity between ones of the individual patches, the determining based at least in part on patch representations; removing at least some of the individual patches from individual clusters of the plurality of clusters based at least in part on the similarity values; and training a classifier for the plurality of labels based at least in part patch-based features extracted from the individual clusters.

B. A computer-implemented method as paragraph A recites, wherein extracting patch representations from the individual patches comprises extracting features from the individual patches via latent Dirichlect allocation (LDA).

C. A computer-implemented method as paragraph B recites, wherein determining the similarity values representative of the similarity between the individual patches comprises: standardizing patch representations extracted from a first individual patch of the individual patches and a second individual patch of the individual patches to a predetermined canonical size; and computing a dot product based at least in part on the standardized patch representations of the first individual patch and the second individual patch.

D. A computer-implemented method as paragraph C recites, wherein the first individual patch is part of a particular cluster of the plurality of patches associated with the at least one label of the plurality of labels and the second individual patch is part of a different cluster of the plurality of patches associated with a different label of the plurality of labels.

E. A computer-implemented method as paragraph C recites, wherein the first individual patch and the second individual patch are part of a same cluster of the plurality of clusters, the same cluster associated with a same label of the plurality of labels.

F. A computer-implemented method as any of paragraphs A-E recite, wherein removing at least some of the individual patches from the individual clusters comprises: accessing a plurality of individual patches in a particular cluster of the plurality of clusters; determining nearest neighbors of individual patches of the plurality of individual patches based at least in part on the similarity values; determining entropy values for the individual patches based at least in part on determining the nearest neighbors of the individual patches; and removing at least some individual patches with entropy values above a predetermined threshold.

G. A computer-implemented method as paragraph F recites, further comprising: ordering the individual patches based at least in part on the entropy values associated with the individual patches; processing the ordered individual patches via a plurality of iterations, the processing including determining nearest neighbor patches for each of the ordered individual patches; removing nearest neighbor patches for each of the ordered individual patches in each iteration of the plurality of iterations; determining that a particular individual patch of the individual patches had a number of nearest neighbors above a predetermined threshold with entropy values below a predetermined threshold; and selecting the particular individual patch for training the classifier.

H. One or more computer-readable media encoded with instructions that, when executed by a processor, configure a computer to perform a method as any of paragraphs A-G recites.

I. A device comprising one or more processors and one or more computer-readable media encoded with instructions that, when executed by the one or more processors, configure a computer to perform a computer-implemented method as recited in any of paragraphs A-G.

J. A system comprising: computer-readable media storing one or more modules; a processing unit operably coupled to the computer-readable media, the processing unit adapted to execute the one or more modules, the one or more modules comprising: a patch extracting module to access a plurality of images and extract one or more patches from individual images of the plurality of images; a feature extracting module to extract patch-based features from the one or more patches and patch representations from individual patches of the one or more patches; a clustering module to arrange the individual patches into a plurality of clusters based at least in part on the patch-based features; a refining module to remove at least some of the individual patches from individual clusters of the plurality of clusters based at least in part on entropy values and diversity selection; and a learning module to train a classifier for at least one label based at least in part on the individual clusters.

K. A system as paragraph J recites, further comprising a receiving module to receive the plurality of images based at least in part on a query of the at least one label.

L. A system as paragraph J or K recites, further comprising a filtering module to remove at least some of the individual images based at least in part on: the at least some of the individual images having entropy values above a predetermined threshold; or the at least some of the individual images and negative images having image similarity values above a predetermined threshold.

M. A system as any of paragraphs J-L recite, wherein the feature extracting module further extracts global features from the individual images, the global features representing contextual information about the individual images.

N. A system as paragraph M recites, wherein the learning module trains the classifier for the at least one label based at least in part on the global features and the patch-based features.

O. A system as any of paragraphs J-N recite, wherein the refining module further determines similarity values representative of similarities between individual patches of the one or more patches, the determining comprising: standardizing patch representations extracted from a first individual patch of the individual patches and a second individual patch of the individual patches to a predetermined canonical size; and computing a dot product based at least in part on the standardized patch representations of the first individual patch and the second individual patch.

P. A system as any of paragraphs J-O recite, wherein the refining module removes the at least some of the individual patches from the individual clusters of the plurality of clusters based at least in part on: accessing a plurality of individual patches in a particular cluster of the plurality of clusters; determining nearest neighbors of individual patches of the plurality of patches based at least in part on the similarity values; determining entropy values based at least in part on determining the nearest neighbors to individual patches; filtering at least some of the individual patches with entropy values above a predetermined threshold, remaining individual patches of the plurality of individual patches comprising filtered patches; determining nearest neighbor patches for the filtered patches via a plurality of iterations; removing nearest neighbor patches for the filtered patches in each iteration of the plurality of iterations; determining that a particular filtered patch of the filtered patches had a number of nearest neighbors below a predetermined threshold with entropy values below a predetermined threshold; and removing the particular filtered patch.

Q. A system as any of paragraphs J-P recite, further comprising a classifying module to store the classifier for the at least one label.

R. A system as any of paragraphs J-Q recite, further comprising a receiving module to receive a new image for classifying by the classifier.

S. One or more computer-readable media encoded with instructions that, when executed by a processor, configure a computer to perform acts comprising: accessing a plurality of weakly supervised images; extracting one or more patches from individual weakly supervised images of the plurality of weakly supervised images; extracting patch-based features from the one or more patches; extracting patch representations from the one or more patches; arranging individual patches into a plurality of clusters based at least in part on the patch-based features; removing at least some of the individual patches from individual clusters of the plurality of clusters based at least in part on similarity values representative of similarity between ones of the individual patches; and training a classifier for at least one label based at least in part on the plurality of clusters.

T. One or more computer-readable media as paragraph S recites, wherein training the classifier comprises: extracting new patch-based features from remaining individual patches of the individual clusters; and training the classifier based at least in part on the new patch-based features.

U. One or more computer-readable media as paragraph S or T recites, wherein the acts further comprise, prior to extracting the one or more patches from the multimedia weakly supervised data items, filtering the plurality of weakly supervised images, the filtering including: determining nearest neighbors for each individual weakly supervised images of the plurality of weakly supervised images; arranging one or more individual weakly supervised images within a predetermined distance into image clusters; determining an entropy value for each individual weakly supervised image in an individual image cluster of the image clusters, wherein determining an entropy value for each individual weakly supervised image comprises determining a similarity value representing a similarity between each individual weakly supervised image in a particular image cluster and each individual weakly supervised image in one or more other image clusters; and removing at least some of the individual weakly supervised images when the entropy value is above a predetermined threshold.

V. One or more computer-readable media as any of paragraphs S-U recite, wherein the acts further comprise, prior to extracting the one or more patches from the multimedia weakly supervised data items, filtering the plurality of weakly supervised images, the filtering including: collecting negative images; comparing the individual weakly supervised images with the negative images; and removing one or more of the individual weakly supervised images from the plurality of images based at least in part on the one or more of the individual weakly supervised images and the negative images having similarity values above a predetermined threshold.

W. A device comprising one or more processors and one or more computer readable media as recited in any of paragraphs S-V.

X. A system comprising: computer-readable media; one or more processors; and one or more modules on the computer-readable media and executable by the one or more processors to perform operations comprising: accessing a plurality of weakly supervised images; extracting one or more patches from individual weakly supervised images of the plurality of weakly supervised images; extracting patch-based features from the one or more patches; extracting patch representations from the one or more patches; arranging individual patches into a plurality of clusters based at least in part on the patch-based features; removing at least some of the individual patches from individual clusters of the plurality of clusters based at least in part on similarity values representative of similarity between ones of the individual patches; and training a classifier for at least one label based at least in part on the plurality of clusters.

Y. A system as paragraph X recites, wherein training the classifier comprises: extracting new patch-based features from remaining individual patches of the individual clusters; and training the classifier based at least in part on the new patch-based features.

Z. A system as paragraph X or Y recites, wherein the operations further comprise, prior to extracting the one or more patches from the multimedia weakly supervised data items, filtering the plurality of weakly supervised images, the filtering including: determining nearest neighbors for each individual weakly supervised images of the plurality of weakly supervised images; arranging one or more individual weakly supervised images within a predetermined distance into image clusters; determining an entropy value for each individual weakly supervised image in an individual image cluster of the image clusters, wherein determining an entropy value for each individual weakly supervised image comprises determining a similarity value representing a similarity between each individual weakly supervised image in a particular image cluster and each individual weakly supervised image in one or more other image clusters; and removing at least some of the individual weakly supervised images when the entropy value is above a predetermined threshold.

AA. A system as any of paragraphs X-Z recite, wherein the operations further comprise, prior to extracting the one or more patches from the multimedia weakly supervised data items, filtering the plurality of weakly supervised images, the filtering including: collecting negative images; comparing the individual weakly supervised images with the negative images; and removing one or more of the individual weakly supervised images from the plurality of images based at least in part on the one or more of the individual weakly supervised images and the negative images having similarity values above a predetermined threshold.

CONCLUSION

Although the subject matter has been described in language specific to structural features and/or methodological acts, it is to be understood that the subject matter defined in the appended claims is not necessarily limited to the specific features or acts described. Rather, the specific features and acts are described as illustrative forms of implementing the claims.

Conditional language such as, among others, "can," "could," "might" or "may," unless specifically stated otherwise, are understood within the context to present that certain examples include, while other examples do not necessarily include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

What is claimed is:

1. A computer storage media encoded with instructions that, when executed by a processor, configure a computer to perform acts comprising:

accessing a plurality of weakly supervised images;
extracting one or more patches from individual weakly supervised images of the plurality of weakly supervised images;
extracting patch-based features from the one or more patches;
arranging individual patches into a plurality of clusters based at least in part on the patch-based features;
removing at least some of the individual patches from at least one cluster of the plurality of clusters based at least in part on similarity values representative of a similarity between ones of the individual patches arranged in the at least one cluster; and
training a classifier for at least one label of a plurality of labels based at least in part on the plurality of clusters, comprising:
extracting new patch-based features from remaining individual patches of the at least one cluster; and
training the classifier based at least in part on the new patch-based features.

2. The computer storage media as claim 1 recites, wherein the acts further comprise, prior to extracting the one or more patches from the individual weakly supervised images, filtering the plurality of weakly supervised images, the filtering including:
determining nearest neighbors for each individual weakly supervised image of the plurality of weakly supervised images;
arranging one or more individual weakly supervised images within a predetermined distance into image clusters;
determining an entropy value for each individual weakly supervised image in an individual image cluster of the image clusters, wherein determining an entropy value for each individual weakly supervised image comprises determining a similarity value representing a similarity between each individual weakly supervised image in a particular image cluster and each individual weakly supervised image in one or more other image clusters; and
removing at least some of the individual weakly supervised images when the entropy value is above a predetermined threshold.

3. The computer storage media as claim 1 recites, wherein the acts further comprise, prior to extracting the one or more patches from the individual weakly supervised images, filtering the plurality of weakly supervised images, the filtering including:
collecting negative images;
comparing the individual weakly supervised images with the negative images; and
removing one or more of the individual weakly supervised images from the plurality of weakly supervised images based at least in part on the one or more of the individual weakly supervised images and the negative images having similarity values above a predetermined threshold.

4. The computer storage media as claim 1 recites, further comprising: extracting patch representation from the one or more patches, wherein extracting patch representations from the individual patches comprises extracting features from the individual patches via latent Dirichlect allocation (LDA).

5. The computer storage media as claim 4 recites, wherein the acts further comprise determining the similarity values based at least in part on the patch representations.

6. The computer storage media as claim 5 recites, wherein determining the similarity values comprises:
standardizing patch representations extracted from a first individual patch of the individual patches and a second individual patch of the individual patches to a predetermined canonical size; and
computing a dot product based at least in part on the standardized patch representations of the first individual patch and the second individual patch.

7. The computer storage media as claim 6 recites, wherein the first individual patch and the second individual patch are part of a same cluster of the plurality of clusters, the same cluster associated with a same label of the plurality of labels.

8. The computer storage media as claim 1 recites, wherein removing at least some of the individual patches from the individual clusters comprises:
accessing a plurality of individual patches in a particular cluster of the plurality of clusters;
determining nearest neighbors of individual patches of the plurality of individual patches based at least in part on the similarity values;
determining entropy values for the individual patches based at least in part on determining the nearest neighbors of the individual patches; and
removing at least some individual patches with entropy values above a predetermined threshold.

9. The computer storage media as claim 8 recites, wherein the acts further comprise:
ordering the individual patches based at least in part on the entropy values associated with the individual patches;
processing the ordered individual patches via a plurality of iterations, the processing including determining nearest neighbor patches for each of the ordered individual patches;
removing nearest neighbor patches for each of the ordered individual patches in each iteration of the plurality of iterations;
determining that a particular individual patch of the individual patches had a number of nearest neighbors above a predetermined threshold with entropy values below a predetermined threshold; and
selecting the particular individual patch for training the classifier.

10. A system comprising:
one or more processing units; and
computer storage media storing instructions that when executable by the one or more processing units cause the system to perform operations comprising:
accessing a plurality of weakly supervised images;
extracting one or more patches from individual weakly supervised images of the plurality of weakly supervised images;
extracting patch-based features from the one or more patches;
arranging individual patches into a plurality of clusters based at least in part on the patch-based features;
removing at least some of the individual patches from at least one cluster of the plurality of clusters based at least in part on similarity values representative of similarity between ones of the individual patches arranged in the at least one cluster; and
training a classifier for at least one label of a plurality of labels based at least in part on the plurality of clusters, comprising:
extracting new patch-based features from remaining individual patches of the at least one cluster; and
training the classifier based at least in part on the new patch-based features.

11. The system as claim 10 recites, wherein the operations further comprise determining the similarity values based at least in part on:
extracting patch representations from the one or more patches;
standardizing patch representations extracted from a first individual patch of the individual patches and a second individual patch of the individual patches to a predetermined canonical size; and
computing a dot product based at least in part on the standardized patch representations of the first individual patch and the second individual patch.

12. The system as claim 11 recites, wherein the first individual patch and the second individual patch are part of a same cluster of the plurality of clusters, the same cluster associated with a same label of the plurality of labels.

13. The system as claim 10 recites, wherein removing at least some of the individual patches from the individual clusters comprises:
accessing a plurality of individual patches in a particular cluster of the plurality of clusters;
determining nearest neighbors of individual patches of the plurality of individual patches based at least in part on the similarity values;
determining entropy values for the individual patches based at least in part on determining the nearest neighbors of the individual patches; and
removing at least some individual patches with entropy values above a predetermined threshold.

14. The system as claim 13 recites, the operations further comprising:
ordering the individual patches based at least in part on the entropy values associated with the individual patches;
processing the ordered individual patches via a plurality of iterations, the processing including determining nearest neighbor patches for each of the ordered individual patches;
removing nearest neighbor patches for each of the ordered individual patches in each iteration of the plurality of iterations;
determining that a particular individual patch of the individual patches had a number of nearest neighbors above a predetermined threshold with entropy values below a predetermined threshold; and
selecting the particular individual patch for training the classifier.

15. A computer-implemented method comprising:
accessing a plurality of weakly supervised images;
extracting one or more patches from individual weakly supervised images of the plurality of weakly supervised images;
extracting patch-based features from the one or more patches;
arranging individual patches into a plurality of clusters based at least in part on the patch-based features;
removing at least some of the individual patches from at least one cluster of the plurality of clusters based at least in part on similarity values representative of similarity between ones of the individual patches arranged in the at least one cluster; and
training a classifier for at least one label of a plurality of labels based at least in part on the plurality of clusters, comprising:

extracting new patch-based features from remaining individual patches of the at least one cluster; and training the classifier based at least in part on the new patch-based features.

16. The computer-implemented method as claim 15 recites, wherein the operations further comprise determining the similarity values based at least in part on:

extracting patch representations from the one or more patches;

standardizing patch representations extracted from a first individual patch of the individual patches and a second individual patch of the individual patches to a predetermined canonical size; and computing a dot product based at least in part on the standardized patch representations of the first individual patch and the second individual patch.

17. The computer-implemented method as claim 15 recites, wherein removing at least some of the individual patches from the individual clusters comprises: accessing a plurality of individual patches in a particular cluster of the plurality of clusters; determining nearest neighbors of individual patches of the plurality of individual patches based at least in part on the similarity values; determining entropy values for the individual patches based at least in part on determining the nearest neighbors of the individual patches; and removing at least some individual patches with entropy values above a predetermined threshold.

18. The computer-implemented method as claim 17 recites, the operations further comprising:

ordering the individual patches based at least in part on the entropy values associated with the individual patches;

processing the ordered individual patches via a plurality of iterations, the processing including determining nearest neighbor patches for each of the ordered individual patches;

removing nearest neighbor patches for each of the ordered individual patches in each iteration of the plurality of iterations;

determining that a particular individual patch of the individual patches had a number of nearest neighbors above a predetermined threshold with entropy values below a predetermined threshold; and selecting the particular individual patch for training the classifier.

19. The computer-implemented method as claim 16 recites, wherein the first individual patch and the second individual patch are part of a same cluster of the plurality of clusters, the same cluster associated with a same label of the plurality of labels.

20. The computer-implemented method as claim 16 recites, wherein the acts further comprise determining the similarity values based at least in part on the patch representations.

* * * * *